United States Patent [19]

Niwa et al.

[11] Patent Number: 5,721,835
[45] Date of Patent: Feb. 24, 1998

[54] INFORMATION PROCESSING SYSTEM, ELECTRONIC DEVICE AND CONTROL METHOD

[75] Inventors: Nobuyuki Niwa, Tokyo; Yasuhiro Yokota, Yokohama; Shinji Shiraga, Kawasaki; Tomoaki Kikuchi, Ayase; Hiroya Miura, Tokyo; Kenji Morita, Yokohama, all of Japan

[73] Assignee: Canon Kabushiki Kaisha, Tokyo, Japan

[21] Appl. No.: 380,093

[22] Filed: Jan. 30, 1995

[30] Foreign Application Priority Data

Feb. 4, 1994 [JP] Japan .................. 6-013023

[51] Int. Cl.$^6$ .................................. G06F 13/00
[52] U.S. Cl. .................. 395/281; 395/188.01
[58] Field of Search ............... 395/281, 750, 395/188.01; 364/708.1

[56] References Cited

U.S. PATENT DOCUMENTS

| | | | |
|---|---|---|---|
| 4,903,222 | 2/1990 | Carter et al. | 364/708 |
| 5,265,238 | 11/1993 | Canova, Jr. et al. | 395/500 |
| 5,361,358 | 11/1994 | Cox et al. | 397/700 |
| 5,394,552 | 2/1995 | Shirota | 395/750 |
| 5,396,400 | 3/1995 | Register et al. | 361/686 |
| 5,411,416 | 5/1995 | Balon et al. | 439/639 |
| 5,452,454 | 9/1995 | Basu | 395/700 |
| 5,454,110 | 9/1995 | Kannan et al. | 395/700 |
| 5,463,742 | 10/1995 | Kobayashi | 395/281 |
| 5,493,542 | 2/1996 | Odelid | 368/10 |
| 5,497,492 | 3/1996 | Zbikowski et al. | 395/700 |
| 5,526,493 | 6/1996 | Shu | 395/281 |
| 5,537,343 | 7/1996 | Kikinis et al. | 364/708.1 |
| 5,577,210 | 11/1996 | Abodous et al. | 395/200 |
| 5,604,890 | 2/1997 | Miller | 395/500 |

FOREIGN PATENT DOCUMENTS 4342005  11/1992  Japan .

*Primary Examiner*—Jack B. Harvey
*Assistant Examiner*—David A. Wiley
*Attorney, Agent, or Firm*—Fitzpatrick, Cella, Harper & Scinto

[57] ABSTRACT

It is made possible to maintain the security of one electronic device to which a plurality of other electronic devices are capable of being connected. To accomplish this, a notebook-type personal computer has an internal ROM storing ID information specific to this personal computer. The notebook-type personal computer is folded up and inserted into a docking station through an insertion port so as to be electrically connected to the docking station and rendered capable of executing processing that utilizes the resources of the docking station. The docking station has an internal non-volatile memory storing the IDs of notebook-type personal computers that are allowed to use the docking station. When a notebook-type personal computer is inserted into and connected with the docking station, use of the docking station is not allowed if the ID of this notebook-type personal computer has not been stored in the docking station.

13 Claims, 22 Drawing Sheets

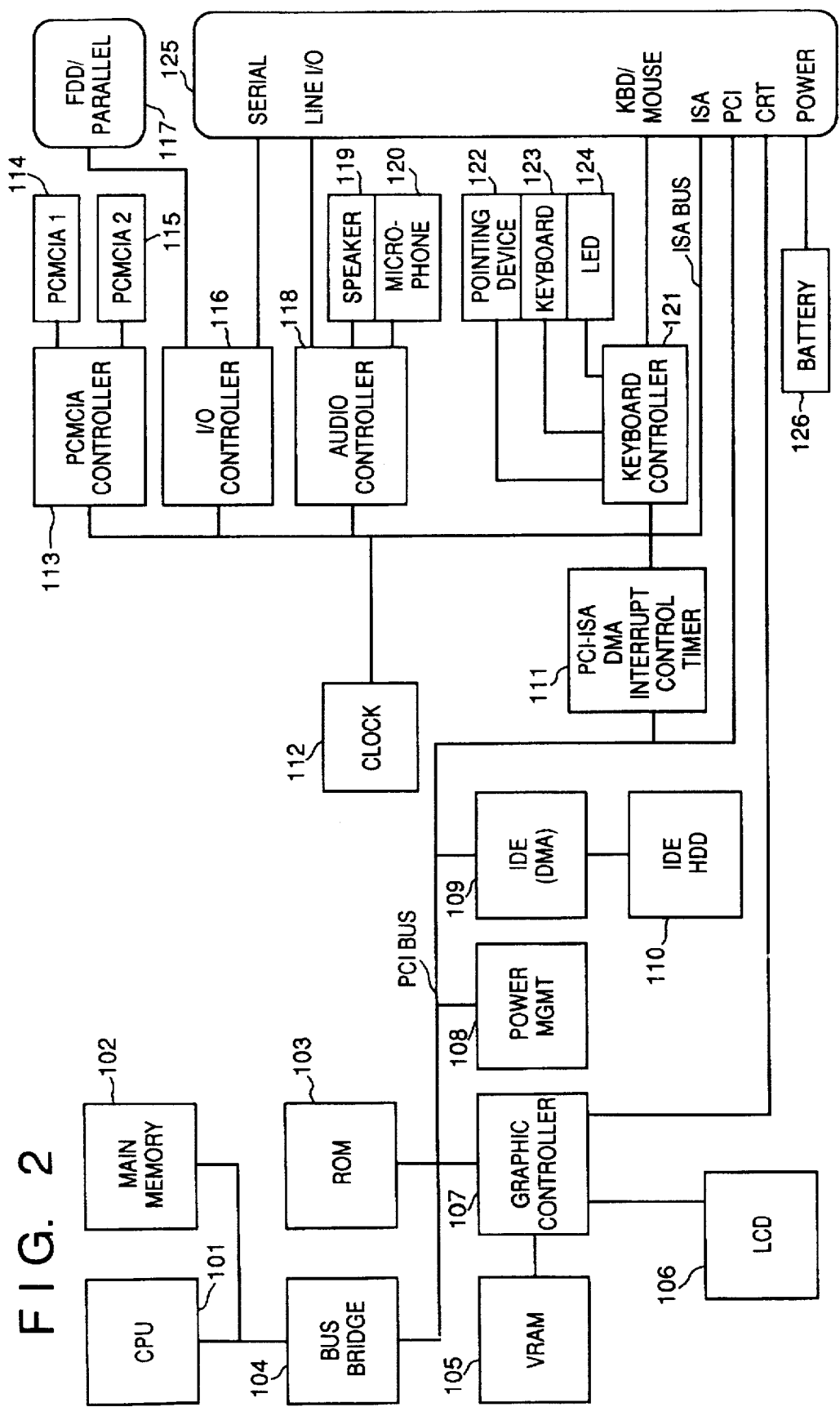
F I G. 2

FIG. 10

```
MENU

1. SELECT OS

2. FILE SECURITY

3. CHANGE DEVICE

4. DELETE USER

5. CHANGE PASSWORD
```

FIG. 12

[[ SELECTION OF OS ]]

BOOTABLE DEVICES AND THEIR OPERATING SYSTEMS
ARE AS FOLLOWS :

| NO. | DEVICES | OS NAME |
|---|---|---|
| 1. | HD0 (NOTEBOOK PC) | OS/A |
| 2. | HD1 (DOCKING STATION) | OS/B |
| 3. | NETWORK (SERVER : XXXX) | OS/C |

WHICH DEVICE OS DO YOU SELECT?  2

FIG. 13

[[ OS ADVISER ]]

THE SELECTED OS/C CANNOT ASSURE EFFICIENT OPERATION
IN THIS SYSTEM FOR THE FOLLOWING REASON.

16MB OF MEMORY IS REQUIRED

PLEASE LOAD THE OS
AFTER ELIMINATING THE CAUSE CITED ABOVE.

CONTINUE WITH LOADING OF THE OS? (Y/N)  N ved 5,721,835

INFORMATION PROCESSING SYSTEM, ELECTRONIC DEVICE AND CONTROL METHOD

BACKGROUND OF THE INVENTION

This invention relates to an information processing system and to a control method. More particularly, the invention relates to a system constituted by a first electronic device, such as a portable personal computer, and a second electronic device that extends the functionality of the first electronic device.

Recent advances in electronics technology have been remarkable. In particular, word processors and personal computers, which once were housed in large-sized cases, are now capable of being folded up and have become so small that they can be carried under one's arm. These devices are now known as notebook-type personal computers and word processors. Such a device shall be referred to generically as a "notebook PC" hereinafter.

Because desktop devices readily lend themselves to extension of functionality and possess large display screens, these devices are still in wide use. Such a device generally is referred to as a "desktop PC".

The present invention is directed to an organic union of a notebook PC and desktop PC.

As mentioned above, the most important feature of a notebook PC is its portability but a desktop PC is more convenient in terms of its operating environment.

Accordingly, in systems existing heretofore, data or the like created by processing using a notebook PC is stored temporarily on an external storage medium (e.g., a floppy disk), the medium is subsequently inserted in a desktop PC, the data from the medium is loaded in the desktop PC and processing is resumed using the desktop PC.

The problem here is that it is essential that an application program identical or compatible with an application program that operates in the notebook PC be loaded also in the desktop PC. In other words, whenever one application program is newly introduced, it is required that the operator introduce the program to both the desktop PC and notebook PC. This is an extremely troublesome task.

Further, even if the same application is run on both personal computers (both desktop and notebook PCs), generally the operating environment of each personal computer can be changed freely by the respective operator. For example, the operating environment involved in a kana-to-kanji conversion and the dictionary used (inclusive of the registered words) differs for each individual operator.

Accordingly, in a case where data outputted from a notebook PC to a floppy disk or the like is loaded in a desktop PC and edited by the desktop PC, the operating environment may be completely different. This problem can be solved if the operator of the desktop PC changes its environment to his or her own liking. However, this can lead to one's imposing one's own operating environment upon another individual because the desktop PC may be operated by a number of individuals. The only alternative is to set the environment each time.

In a system now available, a notebook PC is paired with a separate case or housing referred to as a "docking station". After closing the cover of the notebook PC (namely the portion containing the liquid-crystal display), the user fits the notebook PC into the docking station to connect the two together, after which the keyboard and the CRT display monitor with which the docking station comes equipped can be utilized to operate the notebook PC. The docking station mentioned here has an external appearance the same as that of a desktop PC except for the fact that it is provided with an opening for receiving the notebook PC and executes processing using the CPU on the side of the notebook PC. In other words, the docking station can best be considered as being a device that extends the functionality of the notebook PC.

Such a system is advantageous in terms of conserving space since the notebook PC is accommodated within the docking station. Another advantage is that the notebook PC serves as the platform of the operating environment, which does not change when the notebook PC is connected to and used with the docking station. In addition, purchasing the system is much less expensive than purchasing both a desktop PC and a notebook PC.

When such a system is introduced, however, an unspecified large number of users (notebook PCs) can be connected to the docking station and it is no longer easy to maintain the security of the hardware resources of the docking station. For example, when the docking station itself is provided with extended functions and a large-capacity hard disk or the like is connected to the docking station, the utmost security is necessary for data stored on the hard disk if it is desired that this data not be seen by outsiders. Unfortunately, however, such tight security is not presently available in the art.

SUMMARY OF THE INVENTION

Accordingly, an object of the present invention is to provide an information processing system, as well as a control method, in which it is possible to maintain the security of one electronic device to which a plurality of other electronic devices are capable of being connected.

According to the present invention, the foregoing object is attained by providing an information processing system constituted by a first electronic device having a standard input/output unit and being capable of executing processing independently, and a second electronic device having a standard input/output unit which, when the first electronic device has been connected to the second electronic device, takes the place of the standard input/output unit of the first electronic device, wherein the first electronic device comprises memory means storing ID information specific to the first electronic device, detecting means for detecting whether the first electronic device has been connected to the second electronic device, judging means for determining, on the basis of the ID information stored in the memory means, whether the first electronic device has been given permission to use the second electronic device if the detecting means detects that the first electronic device has been connected to the second electronic device, and control means for establishing an operating state by using the second electronic device if permission has been given to use the second electronic device, wherein the second electronic device has second memory means storing the ID information of the first electronic device to which permission has been given.

In a preferred embodiment, the second electronic device further includes third memory means for storing a password, and the first electronic device has second judging means which, when a character string is entered using the standard input/output unit of the second electronic device in a case where the first judging means has determined that the permission to use the second electronic device has not been given, compares the entered character string with the password and determines whether the character string and password match, and registration means for registering the ID information of the first electronic device in the second memory means of the second electronic device if matching is determined by the second judging means. As a result, permission for the first electronic device to use the second electronic device can be registered in the second electronic device.

Further, the second electronic device preferably has fourth memory means for storing, for each item of ID information stored by the second memory means, information indicating whether resources which it itself possesses are allowed to be used or not. As a result, resources allowed to be used can be assigned according to whether a user is a novice or an individual who has a sufficient understanding of the system. This makes it possible to prevent accidents such as the inadvertent deletion of an important file by a novice.

In a preferred embodiment, the system further includes means for modifying the data stored in the fourth memory means.

Further, it is preferred that the standard input/output unit be a combination of a keyboard and display device, that the first electronic device be foldable, and that the first and second electronic devices be interconnected by inserting the first electronic device, which has been placed in a folded state, into a prescribed insertion port of the second electronic device. This makes it possible to carry about the first electronic device freely and to conserve space by allowing the first electronic device to be fitted into and accommodated by the second electronic device.

It is preferred that the system further include means for reproducing the content of a display, which appears on the display device of the first electronic device immediately before transition to a suspended state, on the display device of the second electronic device if the first electronic device has been connected to the second electronic device in the suspended state.

Another object of the present invention it to provide an information processing system and a control method whereby maintenance of the confidentiality of data stored in a storage unit provided in the second electronic device can be achieved assuredly and without the awareness of the operator.

According to the present invention, the foregoing object is attained by providing an image processing system constituted by a first electronic device having a standard input/output unit and being capable of executing processing independently, and a second electronic device having a standard input/output unit which, when the first electronic device has been connected to the second electronic device, takes the place of the standard input/output unit of the first electronic device, and a writable storage unit, wherein the first electronic device comprises memory means storing ID information specific to the first electronic device, detecting means for detecting whether the first electronic device has been connected to the second electronic device, encryption means for encrypting data using the ID information as a key when the data is written in the storage unit in a case where the detecting means detects that the first electronic device has been connected to the second electronic device, and decoding means for decoding the data using the ID information as a key when the data stored in the storage unit is read out of the storage unit.

In a preferred embodiment, the storage unit of the second electronic device manages data by a directory and further includes memory means for storing, in correlated form, at least a password of the directory and ID information of the first electronic device, wherein the encryption means encrypts write data if the write destination is a directory stored in the memory means, and the decoding means decodes read-in data if the read-in destination is a directory stored in the memory means. By virtue of this arrangement, files are managed by the directory and the files in the directory become encryption files corresponding to a first electronic device. As a result, even if the first electronic device of another user is connected to the second electronic device, this user cannot decode the encrypted data.

Further, it is preferred that the standard input/output unit be a combination of a keyboard and display device, that the first electronic device be foldable, and that the first and second electronic devices be interconnected by inserting the first electronic device, which has been placed in a folded state, into a prescribed insertion port of the second electronic device. This makes it possible to carry about the first electronic device freely and to conserve space by allowing the first electronic device to be fitted into and accommodated by the second electronic device.

A further object of the present invention is to provide an information processing system and a control method in a system having a first electronic device and a second electronic device in which the display space of the first electronic device is less than that of the second electronic device, wherein after a window application is executed upon connecting the first electronic device to the second electronic device, the application can be executed normally from the display space of the first electronic device without altering window information if the application is subsequently executed in the first electronic device alone.

According to the present invention, the foregoing object is attained by providing an information processing system constituted by a first electronic device having a standard input/output unit which is a combination of at least a keyboard and a display device and being capable of executing a window application independently, and a second electronic device having a keyboard and a display device, wherein when the first electronic device has been connected to the second electronic device, the display device of the second electronic device takes the place of the display device of the first electronic device and is capable of presenting a display in a display space larger than that of the display device of the first electronic device, the first electronic device comprising detecting means for detecting whether the first electronic device has been connected to the second electronic device, stacking means which, if the detecting means detects that the first electronic device has been connected to the second electronic device, stacks window information of the first electronic device before the window application possessed by the first electronic device is executed and a display is presented on the display device of the second electronic device, and restoring means for restoring the window information, which has been stacked by the stacking means, after execution of the window application is finished.

In a preferred embodiment, the first electronic device possesses ID information specific to it and has memory means for storing, in correlated form, items of ID information of individual first electronic devices and items of window information which prevailed when the display device of the second electronic device was used, wherein when a window application in a connected first electronic device is executed, the stacking means stacks the window information of this window application and causes processing to resume also using window information for this window application, the window information being specified by the ID information of the first electronic device and stored by the memory means, and the restoring means stacks window information of an application that was running at a corresponding position in the memory means and restores the window information stacked by the stacking means. As a result, even if a window application is executed in the first electronic device alone and in the second electronic device alone, the window application will run automatically in conformity with the respective environments. It is unnecessary, therefore, to change the window environment each time.

Further, it is preferred that the window information include size and display position information indicative of the display window of the application. Accordingly, even if a window application is executed again by the first electronic device alone after the window application has been executed upon connecting the first electronic device to the second electronic device, the display is presented using the window size and position that prevailed before the first electronic device was connected to the second electronic device.

In a preferred embodiment, the first electronic device possesses ID information specific to it and has a storing step of storing, in correlated form, items of ID information of individual first electronic devices and items of window information which prevailed when the display device of the second electronic device was used, wherein when a window application in a connected first electronic device is executed, the stacking step stacks the window information of this window application and causes processing to resume also using window information for this window application, the window information being specified by the ID information of the first electronic device and stored a the storing step, and the restoring step stacks window information of an application that was running at a corresponding position stored at the storing step and restores the window information stacked at the stacking step.

As a result, when one second electronic device is used mutually by a plurality of first electronic devices, there is no influence from other individuals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram of a notebook PC 100 shown in FIG. 1;

FIG. 10 is a diagram showing an example of an initial menu screen of an embodiment in which the notebook PC is connected to the dock;

FIG. 12 is a diagram showing a menu screen in OS selection processing;

FIG. 13 is a diagram showing an example of a warning message screen in OS selection processing;

DESCRIPTION OF THE PREFERRED EMBODIMENTS

Embodiments according to the present invention will now be described in detail with reference to the accompanying drawings.

Figure 1:
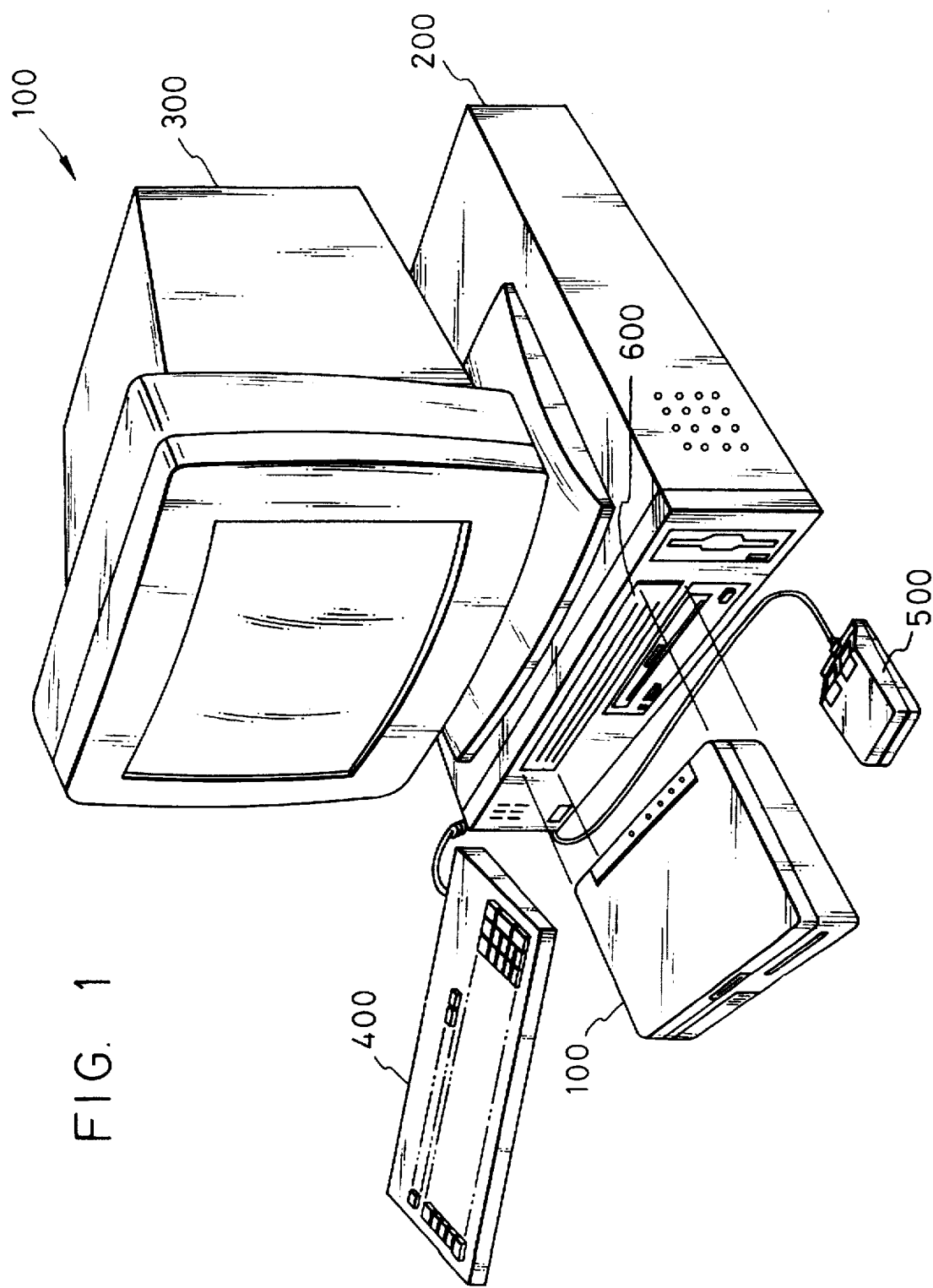
FIG. 1 is a perspective view showing the configuration of a system according to an embodiment of the present invention.

FIG. 1 illustrates the manner in which a notebook PC is connected to a docking station in this embodiment.

As shown in FIG. 1, the system includes a notebook PC 100 (the display section of which is shown in the closed state), and a docking station 1000. The docking station 1000 is constituted by a main body (hereinafter referred to as a "dock") 200, a CRT display unit 300 (which may be a liquid-crystal display or any other type of display) connected to the dock 200, a keyboard 400 and a pointing device 500.

The front side of the dock 200 is provided with an insertion port 600 into which the closed notebook PC 100 is inserted in the manner shown. As a result, an interface (not shown) provided on the back of the notebook PC 100 is connected with an interface (not shown) provided inside the dock 200. This allows the docking station 1000 to function just as if it were a desktop-type electronic device.

The front side of the dock 200 is further provided with a floppy-disk drive and a CD-ROM, as shown, so that these may be used by the operator. The dock 200 is so adapted that various extension boards can be inserted into the back thereof. Accommodated inside the dock 200 are a hard disk and a memory for increasing the memory capacity of the notebook PC 100, though these are not shown.

Figure 3:
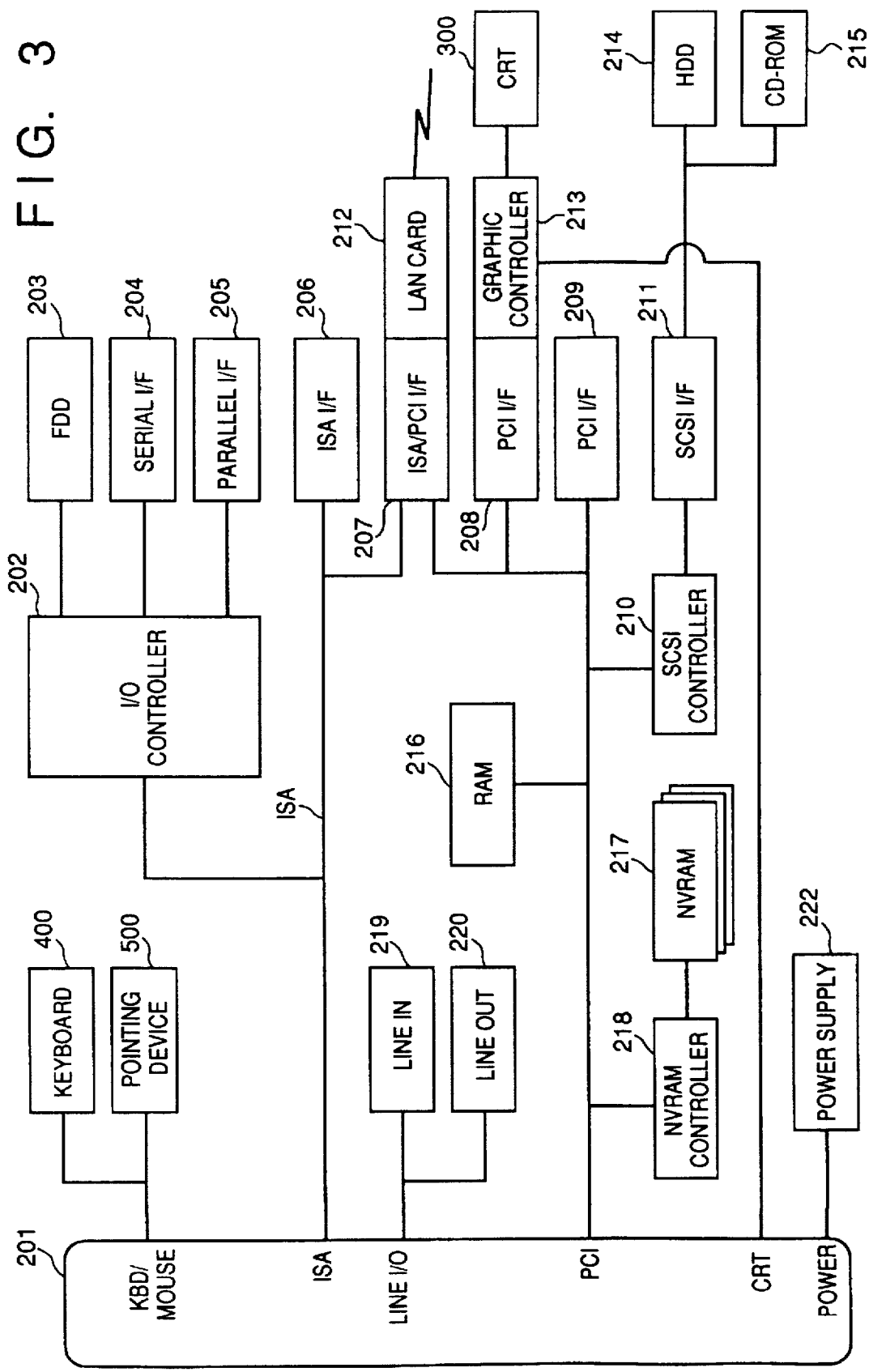
FIG. 3 is a block diagram of a dock 200 shown in FIG. 1.

FIG. 2 illustrates the construction of the notebook PC 100, and FIG. 3 shows the construction of the dock 200.

As shown in FIG. 2, the notebook PC 100 includes a CPU 101 for controlling the notebook PC as well as the dock 200 if the notebook PC is connected to the dock, as will be described latter. An OS and various applications are loaded in a main memory (constituted by a ROM and a RAM) 102 so that they can be executed. A ROM 103, which is connected via a PCI bus (one type of local bus), in the manner shown, stores ID information indicative of each individual notebook PC 100. The value of the ID information differs for each notebook PC manufactured. The bus that connects the CPU 101 and main memory 102 and the PCI bus are interconnected via a bus bridge 104.

The following units are connected to the PCI bus: a VRAM 105 for developing display image data; a liquid-crystal display device (LCD) 106 for displaying the image developed in the VRAM 105; and a graphic controller 107 which executes processing for painting images in the VRAM 105, extracts image from the VRAM 106 and delivers it to the LCD 106 as a video signal. It should be noted that the graphic controller 107 is also equipped with a D/A converter for converting digital bit image data, which has been developed in the VRAM 105, to an analog signal. This output signal is supplied to an extension interface, described later. Also connected to the PCI bus are a power management unit (POWER MGMT) 108, which manages the power supplied from a chargeable battery 126 and, when the capability of the supply becomes too small, causes a message to this effect to be informed the CPU 101, and an IDE controller 109, which controls writing and reading of an IDE-type hard disk 110.

A bus arbitrator 111 for arbitration with the ISA bus is connected to the PCI bus. The bus arbitrator 111 includes a section for controlling data transfer between the PCI bus and ISA bus, a DMA function, an interrupt controller (e.g., for notifying the CPU of an input from the keyboard), and a timer. The timer is used in a case where an interrupt signal is generated periodically.

Connected to the ISA bus are a clock unit 112, which includes a real-time clock and a non-volatile RAM, and a PCMCIA controller which, in a case where various IC cards have been installed, performs an exchange of data with these IC cards. Numerals 114, 115 denote the IC cards. An I/O controller 116 is connected to the floppy-disk drive and extension interface 125 build in the notebook PC. The purpose of the connection to the extension interface is to achieve to connection to the serial interface provided in the dock 200. An audio controller 118 is for performing an exchange of audio data with a speaker 119 and microphone 120 provided internally (or externally) of the notebook PC 100. A keyboard controller 121 makes it possible to control not only a keyboard 123 of the notebook PC but also a mouse 122 and various LED lamps with which the notebook PC is provided. Further, as will be described later, in a case where the notebook PC 100 has been connected to the dock 200, its own keyboard can no longer be used since the notebook PC will have been folded up and closed to effect the connection. For this reason, the keyboard controller 121 is connected to the extension interface 125 as well.

The battery 126 supplies battery power to the notebook PC via the extension interface 125. The reason for this is as follows: If the notebook PC 100 has been connected to the dock 200, charging is performed from the side of the dock. Further, when the notebook PC and dock 200 are in the interconnected state, as a rule power is received from the side of the dock and is used to power both the notebook PC 100 and the dock 200.

It will be readily inferred from the foregoing description that the extension interface 125 is provided at the back of the notebook PC 100 in order to be connected to the interface within the dock 200 so that access can be gained to various devices provided on the bus of the dock 200.

The construction of the dock 200 will now be described with reference to FIG. 3.

As shown in FIG. 3, an interface 201 is for effecting an electrical connection to the extension interface 125 of the notebook PC 100 described earlier. A keyboard 400 and a mouse 500 (see FIG. 1) are connected to a signal line KBD/MOUSE of the interface 201, as a result of which these are connected to the keyboard controller 121 of the notebook PC 100. An I/O controller 202 is connected to the ISA bus of the notebook PC 100. A floppy-disk drive 203 provided on the dock 200 is connected to the I/O controller 202. This makes it possible to save data on an read data from a floppy disk even after the notebook PC 100 has been connected to the dock 200. Also connected to the I/O controller 202 are a serial I/F 204 and a parallel I/F 205 (the respective connectors are provided on the back of the dock). This makes it possible to connect various devices (a modem, etc.) to the dock.

Interfaces (connectors) 206–209, which are for connecting extension boards or cards to the ISA bus or PCI bus, are disposed in extension slots provided at the back of the dock 200. This makes it possible to install various cards or boards. The interface 206 is for the ISA bus, the interface 207 for both the ISA and PCI buses, and the interfaces 208, 209 for the PCI bus. Since the interface 207 is for both the ISA and PCI buses, up to two boards or cards for the ISA bus and up to three boards or cards for the PCI bus can be installed even though the number of interfaces is four.

In the illustration, a LAN card 212 is loaded in interface 207 and a graphic controller card 213 is loaded in the interface 208. Though no explanation is necessary, the LAN card 212 is an extension card (board) for constructing a local area network. The graphic controller card 213 mounts a VRAM of several megabytes. Though the number of display dots of the LCD in the notebook PC 100 is, say, 640×400 dots, the graphic controller 213 extends this to 1024×768 dots. In addition, the graphic controller 213 executes processing for developing bitmap images, raises the speed of movement and increases the number of colors produced.

Though the details will be described later, the graphic controller card 213 merely delivers the input video signal (a CRT signal) to the CRT 300 as is without operating in order to display the image (low resolution) from the VRAM 105 of the notebook PC 100. In this case, the CPU 101 applies various paint instructions to the graphic controller 107 within the notebook PC 100 and causes the display image to be developed in the VRAM 105 of the notebook PC 100.

In a case where a high-resolution, high-speed display using the capability of the graphic controller card 213 is to be presented, the CPU 101 applies various draw and paint instructions to the graphic controller card 213. At such time the graphic controller card 213 ignores the CRT signal sent from the notebook PC 100 and outputs the image data stored in its own VRAM to the CRT 300 as the video signal. If the graphic controller card has not been installed, the video signal from the notebook PC 100 is delivered to the CRT as is.

The dock 200 further includes a hard disk drive 214 connected to an SCSI interface 211, and a CD-ROM drive 215. These memory devices are capable of being used in a case where the notebook PC 100 has been connected to the dock 200. A RAM 216 supplements the main memory 102 of the notebook PC 100 and makes it possible to increase memory capacity so that large programs or large quantities of data can be processed when the notebook PC 100 has been connected to the dock 200. The RAM 216 is a SIMM-type memory and can be added to as necessary. A non-volatile memory (NVRAM) 217 is read and written via an NVRAM controller 218. Though the details will be described later, the NVRAM 217 can store the ID (which differs for each manufactured product) of the dock 200, a password, the IDs of connectable notebook PCs and device information indicative of devices that can be used with these notebook PCs, device table information and the names of directories that are the object of encryption. A line-in terminal 119 and a line-out terminal 220 are connected to the audio interface 118 of the notebook PC 100. An externally attached speaker, a microphone or the like can be connected to these terminals. A power supply 222 converts alternating current from an AC outlet (not shown) to direct current and supplies power to the dock 200. In a case where the notebook PC 100 has been connected to the dock 200, the battery 126 within the notebook PC 100 can be charged and the notebook PC 100 per se can be supplied with power.

It should be noted that common notebook PCs often come equipped with a resumption function. The resumption function itself is well known and need not be described in detail. In brief, power stops being supplied to the display and the clock fed to the CPU is halted in order to suppress power consumption when the display section of the notebook PC is closed or when a prescribed switch on the notebook PC is operated. When the display section is opened again or the prescribed switch operated, the notebook PC is restored to the immediately preceding state and processing is resumed from this state. In the embodiment described here, a power conserving state is established when the display section of the notebook PC 100 is closed. This power conserving state shall be referred to as the "suspended" state hereinafter, and restoring the operating state from the suspended state shall be referred to as "resumption".

The structures of the notebook PC 100 and dock 200 in this embodiment are as set forth above. The manner in which they are connected together will now be described in brief.

First, with the notebook PC 100 in the operating state, its cover is closed to place it in the suspended state. The notebook PC 100 is then inserted into the dock 200 via the insertion port 600, whereby the two become connected electrically.

The back of the notebook PC 100 has a switch (not shown) for sensing that it has been connected to the dock 200. (The switch may be a physical switch or a switch that senses the connection based upon the level of an electric signal.) When the switch is actuated, the notebook PC 100 resumes operation.

Since the notebook PC 100 usually resumes operation also when its cover is opened, the CPU 101 must determine whether it has resumed operation by having been connected to the dock or by having had its cover opened. Accordingly, at an early stage of the resumption process, the CPU 101 judges, based upon the logic level outputted on a separate signal line from the above-mentioned switch, whether processing has been resumed by connection or by opening of the cover of the notebook PC 100. If the CPU 101 judges that processing resumed owing to connection of the notebook PC 100 to the dock 200, the CPU reconstructs the system environment and resumes processing. The details of processing involved in such reconstruction will be described later.

Figure 4:
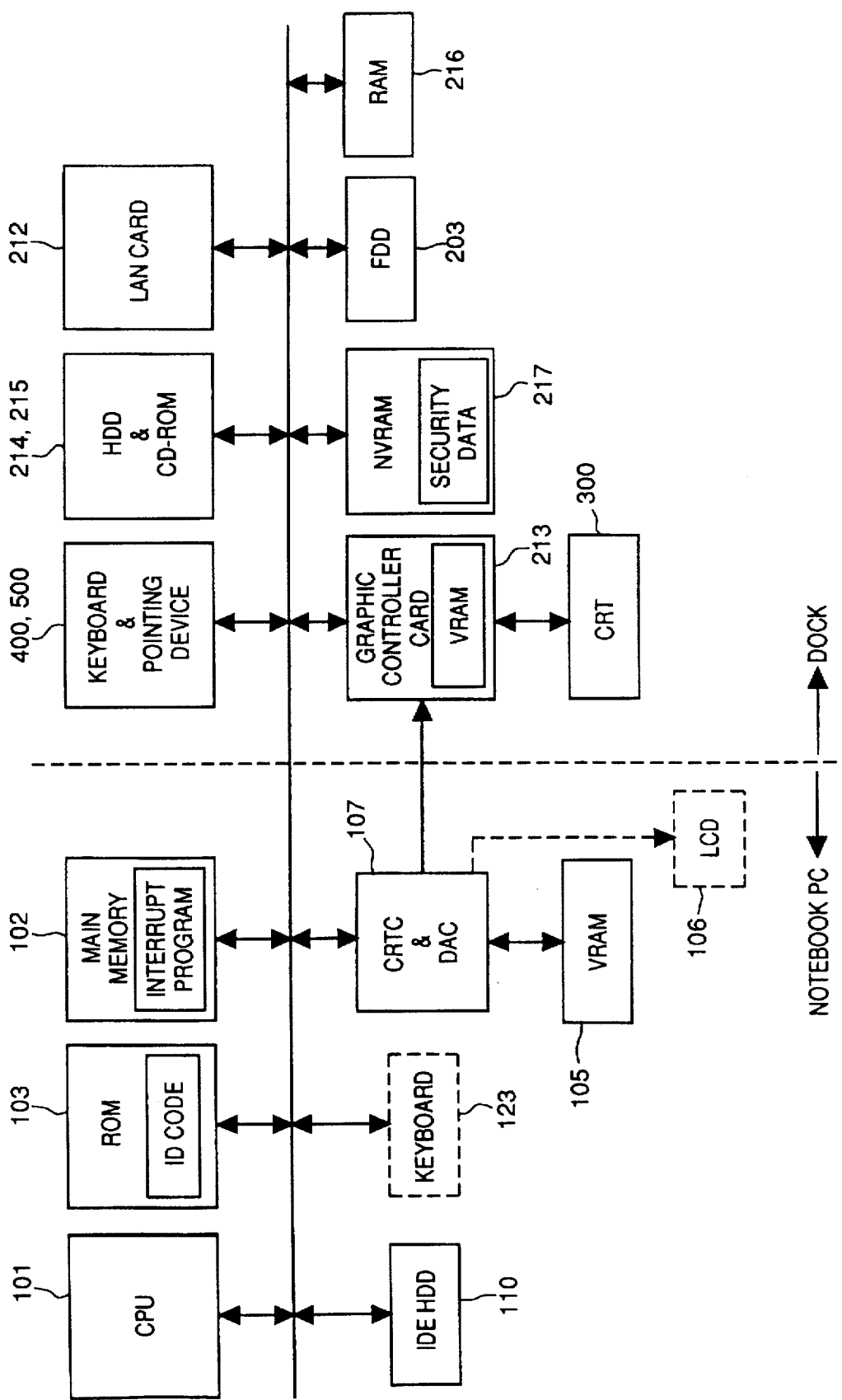
FIG. 4 is a general block diagram showing the notebook PC and the dock when connected.

In a case where the notebook PC 100 has been connected to the dock 200 (i.e., in a case where the notebook PC 100 has been inserted into the insertion port 600 to unite the two), the system configuration becomes as shown in FIG. 4. Here the drawing is shown in simplified form and only the main components are illustrated in order to facilitate the description. The blocks (keyboard 123 and LCD 106) shown by the dashed lines on the side of the notebook PC 100 in FIG. 4 indicate that these are in a state in which they cannot be used on the side of the notebook PC.

The operation of the CPU 101 within the notebook PC 100 of this embodiment will now be described in regular order.

Figure 5:
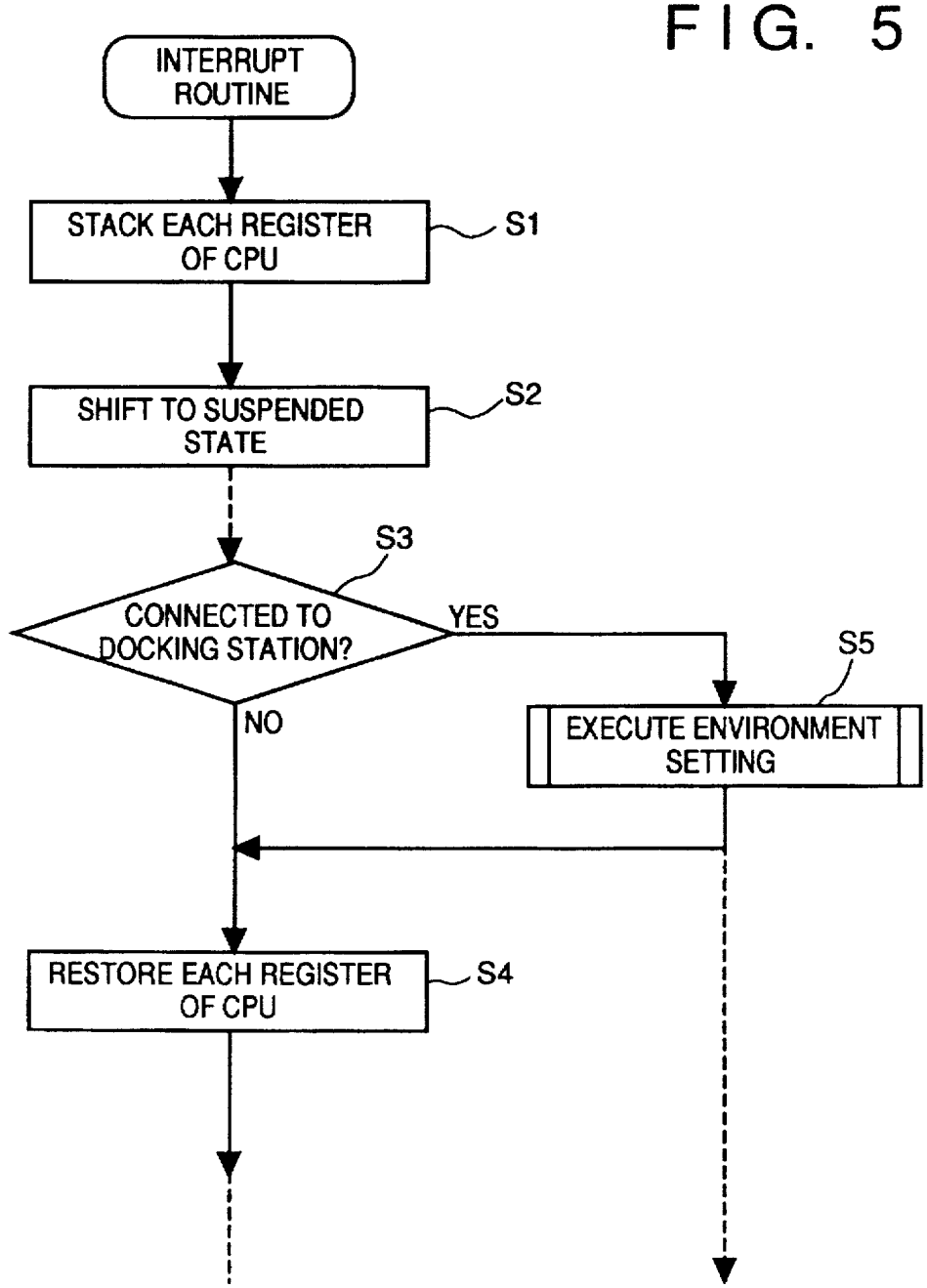
FIG. 5 is a flowchart showing processing through which the notebook PC is placed in the suspended state and processing through which operation of the notebook PC is resumed.

When the cover of the notebook PC 100 is closed while the notebook PC 100 is being used independently and is executing various applications, an interrupt is applied to the CPU 101 and an interrupt processing program stored beforehand in the main memory 102 (the ROM area of the main memory) is started. FIG. 5 illustrates the details of processing in the above-mentioned interrupt processing program.

First, at step S1, the CPU 101 pushes all of its own general-purpose registers onto a stack area of the main memory. At this time the CPU 101 also stores its own resources (e.g., the RAM capacity and the name of the OS running) is a prescribed area. (In this embodiment, the resources are assumed to be stacked though it goes without saying that they can be stored in the hard disk 110.) The program then proceeds to step S2, at which the suspended mode is established, the power to the LCD 106 and other unnecessary devices is cut off and supply of the clock signal to the CPU 101 is halted. (Since the application program that was running and the associated data need to be preserved, the supply of power to the main memory 102 is allowed to continue.)

When the display section of the notebook PC 100 is opened again or when the notebook PC 100 is docked with the dock 200, operation of the notebook PC 100 resumes and processing starts again from step S3.

At step S3, the CPU 101 determines, based upon the status of the switch mentioned above, whether the notebook PC 100 has been connected to the dock 200. If the CPU 101 judges that the notebook PC 100 has not been connected to the dock 200, namely that operation of the notebook PC has resumed owing to opening of its display section, all of the registers that have been made to stand by are restored to operation at step S4 so that the processing which prevailed immediately prior to the transition to the suspended state is resumed.

If the CPU 101 judges that operation of the notebook PC 100 has resumed because of connection to the dock 200, then the program proceeds to step S5, at which processing for establishing the environment is executed. What follows execution of this step differs depending upon the particular case. Specifically, there is the above-mentioned case in which the state which prevailed just prior to suspension is restored (step S4) and a case in which this is not the path taken. This will become clear from the description given below.

Figure 6:
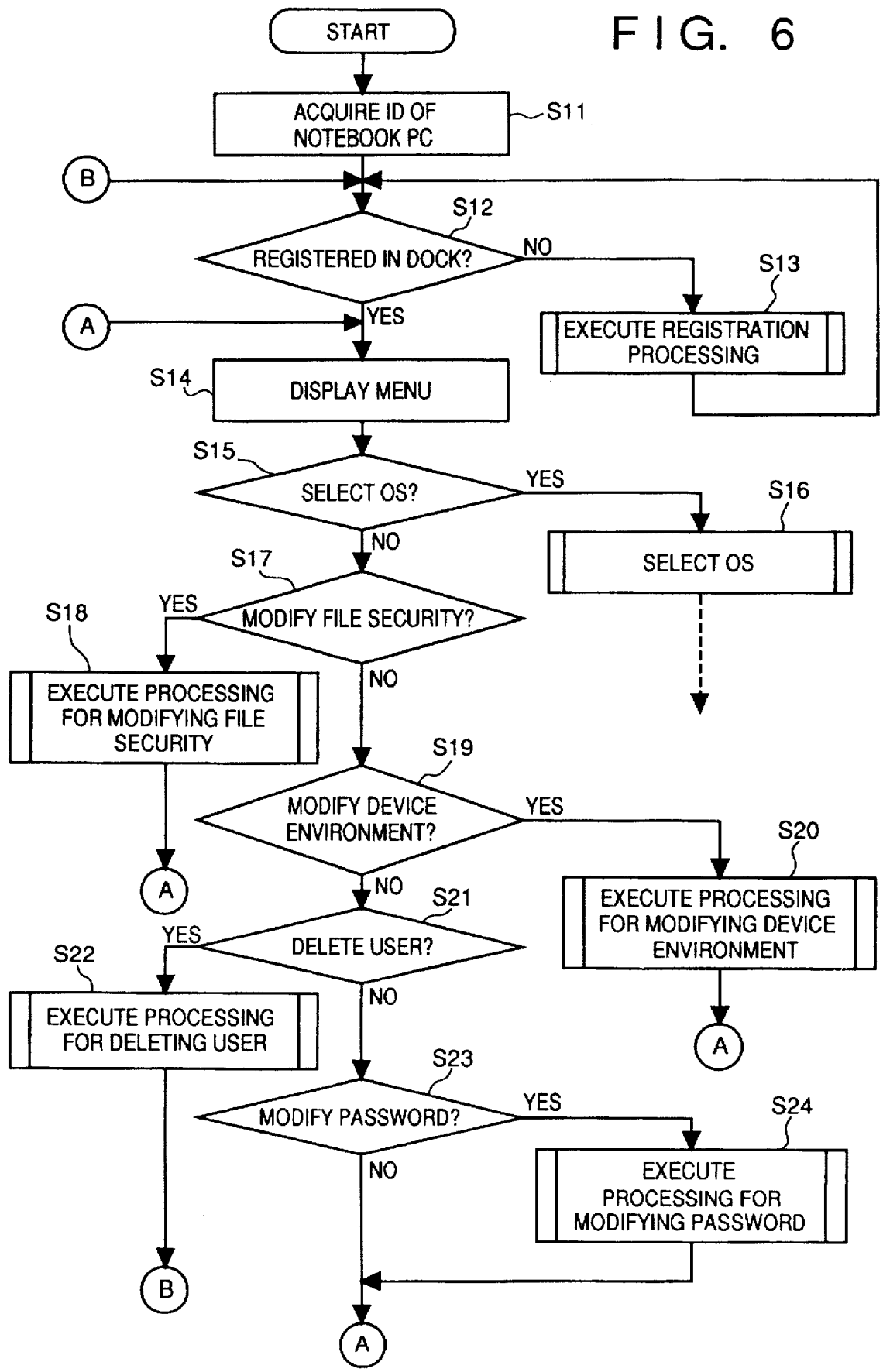
FIG. 6 is a flowchart illustrating the details of a processing step, shown in FIG. 5, for setting an environment.

FIG. 6 illustrates the details of processing for setting the environment.

Figure 9:
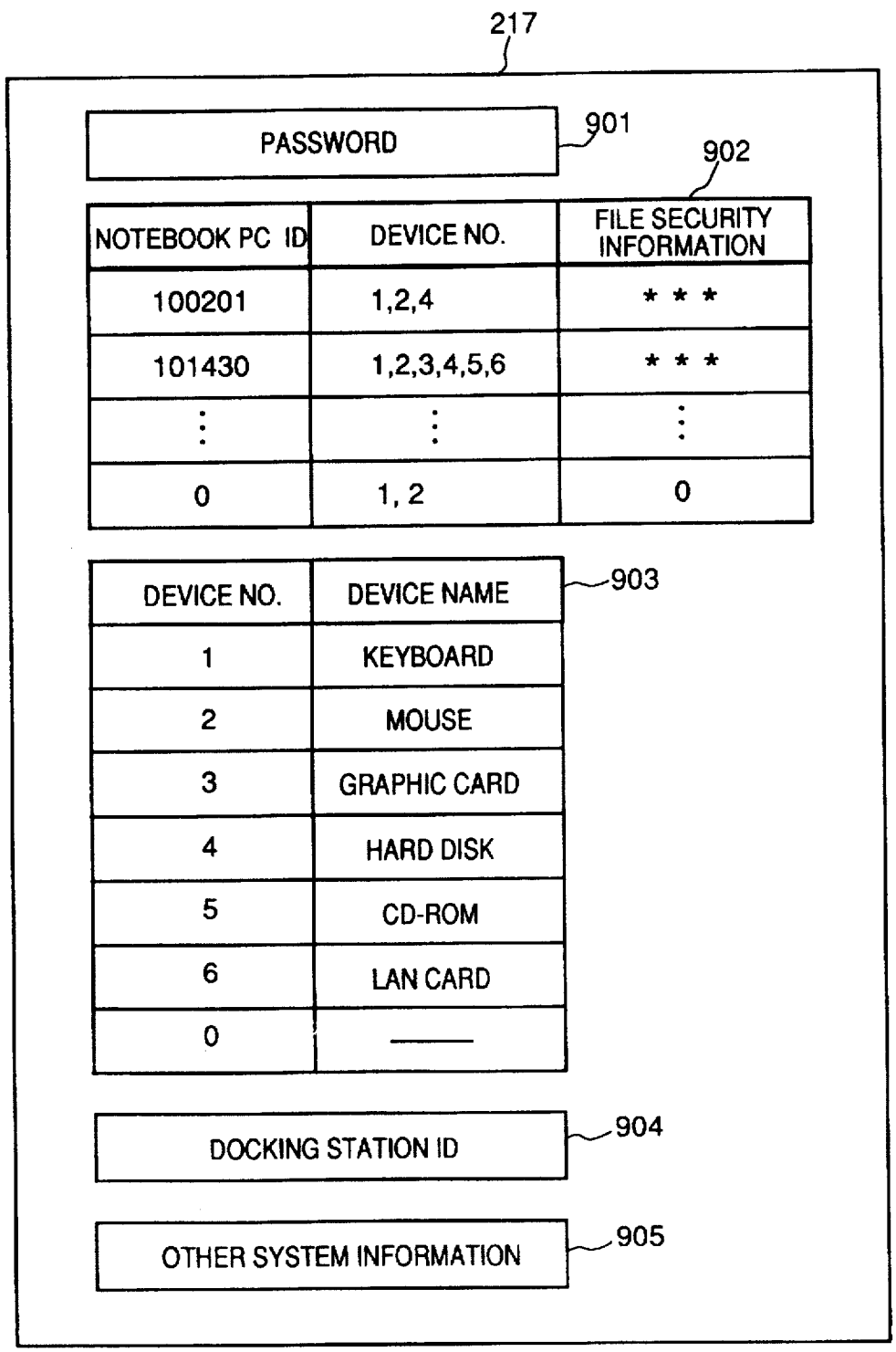
FIG. 9 is a diagram showing the contents of an NVRAM located within the dock according to this embodiment.

First, at step S11, the CPU 101 acquires the notebook PC's own ID, which has been stored in the ROM 103 of the notebook PC 100, and compares the ID with security information located in the NVRAM 217 within the dock 200, thereby determining whether use with the dock 200 is allowed or not. FIG. 9 illustrates the content of the security information, which includes a password 901, a user registration information field 902, which is composed of the IDs of notebook PCs allowed for use, the numbers of devices that can be used and file security information, a device table 903, an ID 904 of the dock and a field 905 for other system information.

Whether or not the connected notebook PC 100 is allowed for use with the dock 200 is determined by successively referring to the notebook PC IDs in the user registration information. If a notebook PC ID coinciding with that of the connected notebook PC is found, then the connected notebook PC is allowed for use; otherwise, it is judged that use of the connected notebook PC is not allowed. It should be noted that the ID of the notebook PC and the ID of the dock are unknown to the user.

In a case where it is determined that the connected notebook PC has not been registered, the program proceeds to step S13, at which registration processing (described later) is executed. In order for the registration procedure to be carried out, at the very least the keyboard 400 with which the dock 200 is provided is enabled. To accomplish this, ID=0 is temporarily assigned to the notebook PC 100. It should be noted that the content of the VRAM 105 of the notebook PC 100 continues to be displayed at low resolution on the CRT display unit 300.

In a case where it is determined that the connected notebook PC has been registered, the program proceeds to step S14, at which an initial menu of the kind depicted in FIG. 10 is displayed. As shown in FIG. 10, the menu includes items for OS selection, file security, change of device, deletion of user and change of password.

While observing the display, the operator selects the desired processing. As a result, processing traverses whichever of decision steps S17, S19, S21, S23 is indicated by the key designated and the corresponding processing (steps S16, S18, S20, S22, S24) is executed. Processing will now be described in order starting from the registration processing of step S13.

<Registration Processing (step S13)>

When the dock is established, it is theoretically possible for the users of a large number of unspecified notebook PCs to exploit freely the resources of the dock. However, this can lead to leakage of information to outsiders. Accordingly, it is so arranged that only users allowed by the supervisor of the dock are permitted to use the dock.

Figure 7:
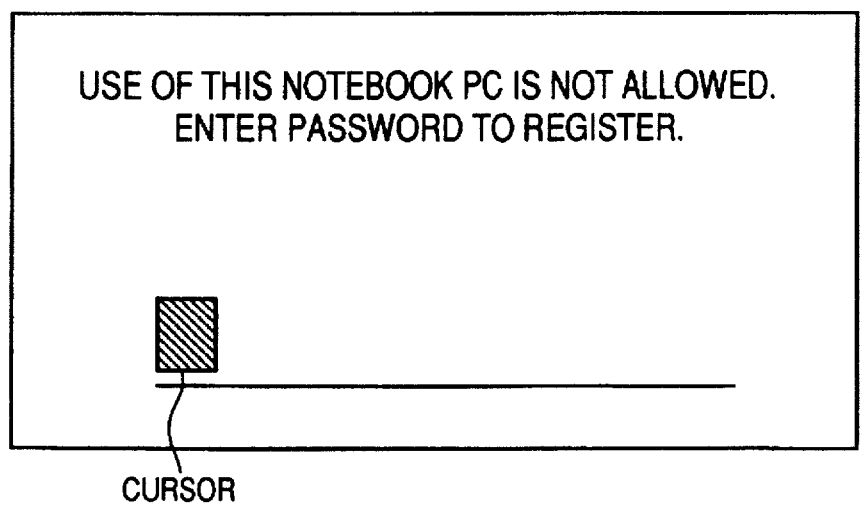
FIG. 7 is a diagram showing a menu screen displayed at execution of a registration processing step shown in FIG. 6.
Figure 8:
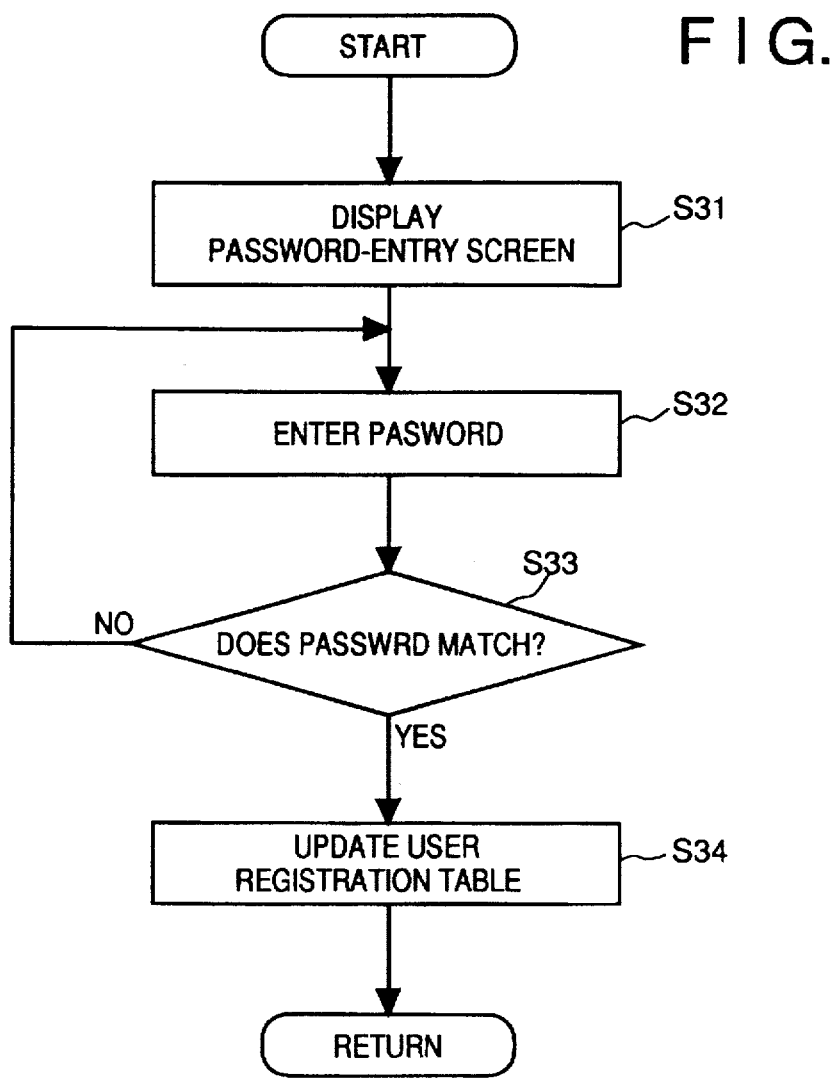
FIG. 8 is a flowchart illustrating the procedure of a registration processing step shown in FIG. 6.

Specifically, a screen of the kind shown in FIG. 7 is presented to allow entry of a password by using the dock keyboard and CRT display unit (these shall be referred to collectively as a "standard input/output unit"), the use whereof is temporarily permitted for password entry. The particular user (or, more specifically, the user's notebook PC) is allowed to use the dock 200 only if the entered password coincides with the password 901 (see FIG. 9) within the NVRAM 217 provided in the dock. That is, an area for this user is prepared anew in the user registration information field 902 and a default device number (only that of the keyboard in this case) of a usable device, as well as file security information, is added on. FIG. 8 illustrates the flow of processing.

First, the password entry screen (see FIG. 7) is displayed at step S31. Next, at step S32, the keyboard 400 is used to enter a character string. This is followed by step S33, at which it is determined whether the entered character string matches the password information 901 registered in the NVRAM 217. If the two do not match, then the program returns to step S32 to allow entry of the password again. Thus, if an individual who does not know the password operates the device, the individual can do nothing more than turn off the power to the device. This is linked to cut-off of power to the notebook PC as well.

If the password matches and, hence, it is judged that an authorized individual is operating the device, then the program proceeds to step S34. Here the ID of the particular notebook PC is added to and registered in the user registration information field 902. Also added on at this step are the device allowed for use by default and the file security information. The location at which the above is added on is made just in front of the notebook PC ID (=0) in the user registration information field 902. In other words, it is so arranged that a judgment can be made, based upon whether or not the ID of the notebook PC is 0, at the end in case of retrieval.

When the above-described processing ends, the program returns.

In practice, when the user of a notebook PC desires connection to the dock, the user most likely would hand the notebook PC over to the supervisor, who would then carry out the procedure described above.

As a result of the foregoing, it becomes possible for only a limited number of users to use the confidential files in a host or server by employing resources, such as the hard disk connected to the dock, as well as a network card in some cases.

An arrangement may be adopted in which, when an authorized notebook PC has been connected to the dock, a password is entered and permission to use the dock is given only in a case where the entered password matches the password belonging to the dock. In this case, it is required that the individual users know the password. When a new user registered, permission for use is given only if the password, known only by the supervisor, is entered.

This arrangement is particularly useful in a case where an outsider connects a notebook PC to the dock, by way example. In such case, even if registration processing for this notebook PC has been completed, the notebook PC cannot be operated upon connection unless the conformed password is entered. This makes it possible to maintain much tighter security.

In actuality, keyboards are of various types. Accordingly, the information shown in FIG. 9 would not include only a single keyboard but would also have information indicating types of keyboards.

<OS Selection (step S16)>

Personal computers are such that operating systems having a large number of functions and a high degree of functionality inconceivable in the past can be used. The purpose of the processing of this step is to make it possible for a notebook PC to operate, simply by being connected to the dock, using an OS under which the notebook PC could not operate independently because of functional and structural limitations. This step broadens the range of selection.

When the numeral "1" for "OS Selection" is selected on the menu of FIG. 10 by using the keyboard 400, an OS selection menu of the kind shown in FIG. 12 is displayed. Here three operating systems are capable of being selected (though whether an OS is capable of running or not is a separate matter).

The operator selects the desired OS from the list. The OS that was running on the notebook PC is situated at the top of the menu. The reason for this is that the OS under which an application was being executed on the notebook PC will most likely be the one selected; placing it at the type of menu makes it the default selection, which is made by pressing the return key (the default value is "1").

Consider a case in which the notebook PC 100 is connected to the dock 200 upon being placed in the suspended state and the OS of this notebook PC is selected from the menu. In order to arrange it so that devices whose use is allowed for the notebook PC 100 are enabled, a procedure in which the devices allowed by the OS can be used is executed, after which the operation of the notebook PC 100 is resumed. (Devices whose use is not allowed are placed in a disabled state.) As a result, it is possible for the user of the notebook PC to continue with the application program that was running immediately prior to attainment of the suspended state and to resume execution of processing while observing the screen of the CRT display unit 300 connected to the dock 200. This is the reason for the existence of step S4, which follows step S5 in FIG. 5, described above.

In a case where a different OS is selected by selecting "2" (the OS that has been stored on the hard disk of the dock) or "3" (an OS stored in a server on a network) in the OS selection menu of FIG. 12, the environment is decided and the selected OS is started up in accordance with the devices allowed for use in the resources of the notebook PC and dock.

The foregoing is an overview of processing for OS selection. The CPU 101 operates in accordance with the flowchart illustrated in FIG. 11.

Figure 11:
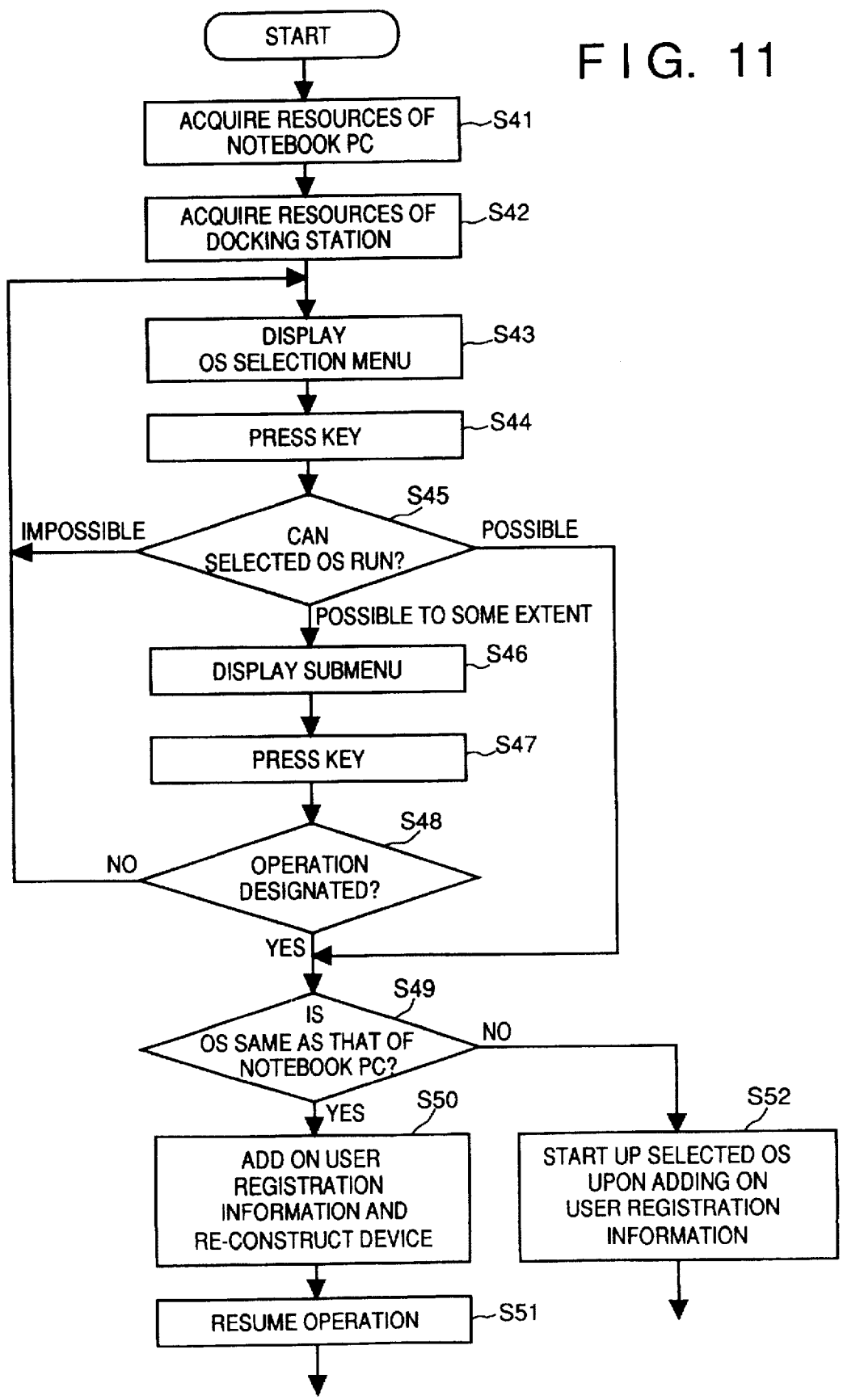
FIG. 11 is a flowchart illustrating the details of an OS selection processing step shown in FIG. 6.

Specifically, at step S41 in FIG. 11, the CPU 101 acquires the resource information (see the details of processing of step S1 in FIG. 5) of the notebook PC stored in a prescribed area of the notebook PC 100, searches for devices attached or connected to the dock 200 and acquires the resources of the dock at step S42.

Next, the program proceeds to step S43, at which the CPU 101 refers to the system information field 905 within the NVRAM 217, searches for bootable devices and reads the boot sectors of the devices found, thereby detecting OS loaders and recognizing the types of operating systems. A list of notebook PCs and recognized operating systems is displayed on the CRT display unit 300 in the form of a menu.

The program then proceeds to step S44, at which a key is pressed. If the key for selecting the OS is pressed, then the program proceeds to step S45, at which it is determined whether the selected OS is capable of being run with the resources available and, if the environment is not the one recommended, then whether the OS will at least run provisionally.

If it is judged that the OS is incapable of running, then a message is displayed to the effect that the designated OS cannot be used. In addition, the program returns to step S43 in order that another OS may be selected. For example, if, in a case where booting from a network has been designated, the user has been forbidden from using the network card 212, a message to this effect is displayed.

If it has been determined that operation is possible to some extent but that this OS cannot be run fully satisfactorily, the program proceeds to step S46. If it is judged that the OS will run satisfactorily in the present environment (i.e., with the devices allowed for use with the notebook PC, the memory capacity, etc.), then the program proceeds to step S49.

The resource information recommended for the selected OS and the resource information capable of running is stored, for each OS, in the system information field 905 within the NVRAM 217. This information is judged as set forth below.

An example in which processing proceeds to step S46 is as follows: The capacity of the main memory recommended for a certain OS to run is 8 MB, the memory capacity at which operation is possible is 4 MB and the result of adding the capacities of the RAM areas of the notebook PC and dock is 4 MB but not the recommended 8 MB. Of course, this limitation does not apply if another notebook PC has sufficient memory capacity and the total of this memory capacity with that of the internal memory of the dock exceeds 8 MB.

Thus, the program proceeds to step S46 if the OS will run to some extent but the conditions are not ideal. A subsidiary menu is displayed at step S46. As shown in FIG. 13 byway of example, this menu displays the reasons why processing proceeded to step S46. This display makes it possible for the user to understand why the OS will not run satisfactorily and, depending upon the particular case, to request the supervisor to take procedures that will allow the OS to run or to request extension of the resources of the notebook PC or dock.

The user observes the screen and presses the "Y" key if start-up is still desired or the "N" key if this operation is to be canceled (step S47). The program proceeds to step S49 in a case where the CPU 101 judges that the pressed key designates resumption of operation but returns to step S43 in a case where the CPU 101 judges that cancellation has been designated. If a special key is pressed at step S44, processing is terminated and the program returns to step S14 of FIG. 6.

When one of the operating systems has been designated and a stage is reached in which the this OS is actually started up, it is determined whether the OS to be started up is the OS under which the notebook PC was operating (step S49).

If it judged that the two operating systems are the same, devices for improving functionality are added on (naturally within the range of devices designated by the device table 903) as the result of connecting the notebook PC to the dock, and processing for registering these devices is executed as well as processing for disabling devices no longer used. In a case where the graphic controller card 213 is used, from this point onward the image displayed on the display screen is that from the VRAM within the graphic controller card 213 and not from the VRAM 105 within the notebook PC 100. Accordingly, this procedure also is performed in the same manner. The processing program for the graphic card is added on the OS as a device driver (the name of this file and its location are stored in the system information field 905 in advance). At this time the graphic card 213 invalidates the CRT signal sent from the notebook PC and causes the image within its own VRAM to be displayed on the CRT display unit 300 at the resolution and number of colors that have been designated. The information regarding resolution and number of colors can be set freely user by user. By way of example, this can be stored together with the device numbers (device number "3" in this case) in the user registration information field 902.

In general, when resolution is raised using a graphic card, the number of pixels increases but the number of colors decreases, though this depends upon the memory capacity. In this embodiment, the set particulars can be changed freely if the user is one for which use of the graphic card 213 has been allowed; the settings need not be used in their present state. However, since previous settings often are utilized again, the resolution and number of colors are stored in the NVRAM 217 at the moment any change in them is made.

The foregoing represents the details of processing at step S50 in FIG. 11. The program then proceeds to step S51, at which resumption processing is executed so that the state that prevailed just prior to transition to the suspended state is caused to reappear at the dock to allow operation.

If the decision rendered at step S49 is that another OS has been selected, then the program proceeds to step S52. Here the loader part of the OS is executed for the purpose of starting up the OS with the notebook PC and devices allowed by the ID of the notebook PC. In this case, therefore, processing does not resume from the suspended state.

Thus, after the notebook PC has been connected to the dock, it is possible to resume processing with the state that was in effect during processing by the notebook PC being reproduced at the desktop.

Further, an OS having highly sophisticated functions that could not be implemented with a notebook PC alone can be started up in a truly simple manner. Moreover, in cases where it is predicted that a fully satisfactory state will not always be attained even though start-up is achieved, a display to this effect is presented in advance to forewarn the user. Accordingly, at this point the user can select whether or not to proceed with start-up.

In the foregoing example, a list of bootable operating systems is displayed. However, since even operating systems that cannot operate at all on the basis of the ID of the notebook PC and the resources of the dock can be scrutinized in the list, an arrangement may be adopted in which such operating systems that are completely impossible to start up are not displayed in the selection menu. This makes it possible to avoid the erroneous selection of operating systems that will not start up and the attendant re-selection of the operating system. However, since informing the user of the reason why an OS cannot be selected is important also in user-interface terms, a display may be presented to display a distinction between operating systems that can be selected and operating systems that cannot. Depending upon the particular case, a display may be presented to display a distinction between operating system that can run provisionally and operating systems that cannot be started up at all. The distinction can be made by color or by appending a message indicating the distinction.

<File-Security Modification Processing (step S18)>

When there are a large number of notebook PCs relative to the number of docks, files not capable of being managed solely by the supervisor of a dock may be saved in the hard disk of this dock. A problem that arises here is that important files of confidential text information may be saved not on the hard disk within one's own notebook PC but on the hard disk of the dock; this information may become known to outsiders.

The file security function is intended to eliminate this problem.

Though the details will be described later, a user creates his or her own directory on the hard disk 214 of the dock and encrypts the file data if the file is written in under the directory, thereby making the file incomprehensible to others even if the file is read out of memory.

In this embodiment, processing is executed for setting the name of a directory to undergo encryption. This will be described with reference to the flowchart of FIG. 14 and to the diagrams of FIGS. 15 and 16.

Figure 14:
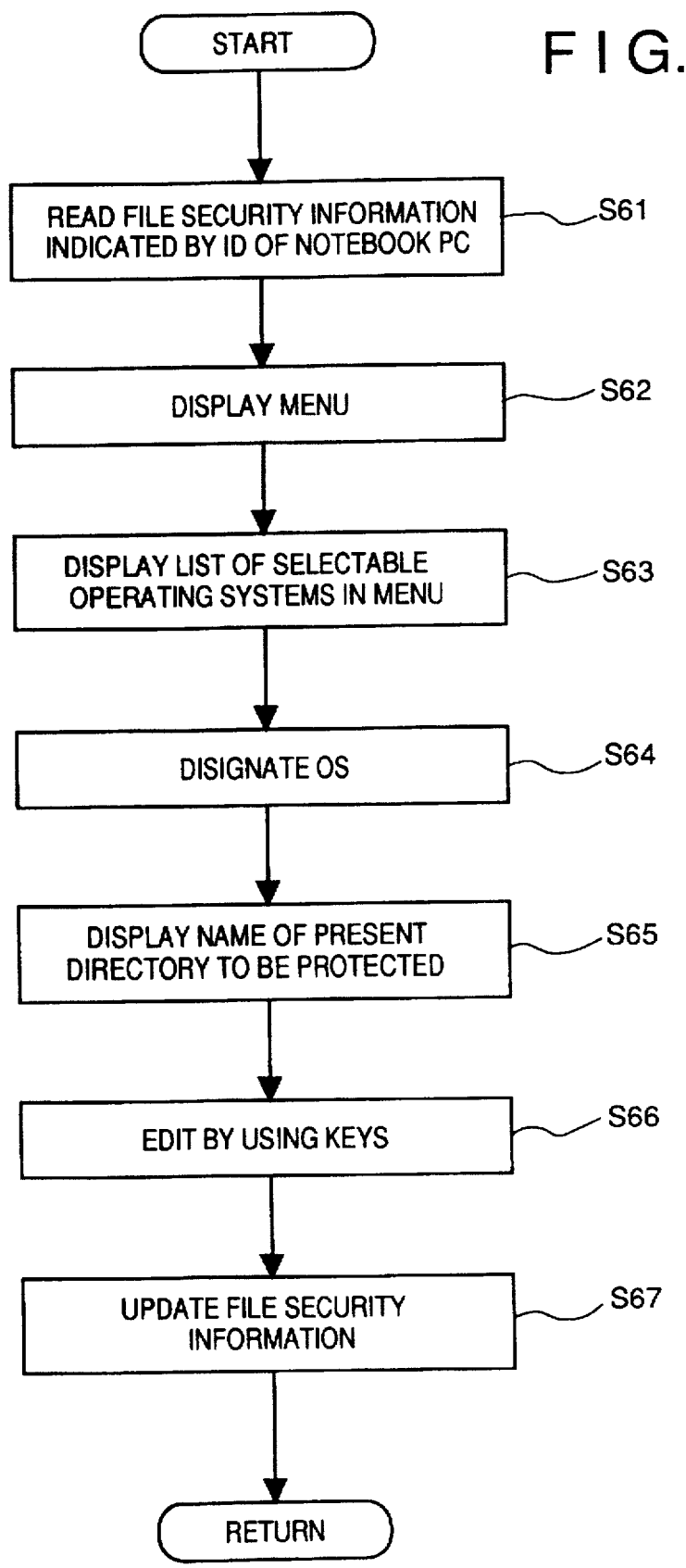
FIG. 14 is a flowchart illustrating the details of a processing step for altering file security shown in FIG. 6.
Figure 16:
FIG. 16 is a diagram showing the contents of file security information.

First, at step S61 in FIG. 14, the CPU 101 reads file security information, which is indicated by the ID of the notebook PC 100, contained in the user registration information within the NVRAM 217. The format of the file security information, which is as illustrated in FIG. 16, by way of example, is composed of the OS names and the names of the directories to be encrypted on these operating systems.

This is followed by step S62, at which an initial menu is displayed, and then by step S63, at which the names of bootable operating systems are displayed as selection items in the menu display. The user observes the display screen and selects one of the OS names. When this is done, information representing the name of the directory, which corresponds to the selected OS, that is to be encrypted is extracted and this is displayed in a state in which it can be revised.

Figure 15:
FIG. 15 is a diagram showing an example of a menu screen for setting directories needing file security.

FIG. 15 illustrates this state. The illustrated state is for a case in which OS/A has been selected. In the illustration, a directory "USR1" of drive A and a directory "WORK" of drive A are indicated as being the objects of encryption. The ";" between the directory names is a breakpoint.

Thereafter, the cursor shown in FIG. 15 is moved and a delete key, insertion key and character keys are pressed to make a revision or addition (step S66). When a prescribed key is then pressed, processing advances to step S67, at which the file security information specified by the ID of the notebook PC presently connected is updated by the content of the editing operation. Naturally, if files can be read and written between separate operating systems, the same directory name is designated with respect to each of these operating systems.

<Device-Environment Modification Processing (step S20)>

As mentioned earlier, the device capable of being used with a newly registered notebook PC is solely the keyboard (the CRT display unit 300 is allowed by default).

Further, in a case where an extension card is newly installed in the dock, the functions of this card cannot be used by a notebook PC that has already been registered. Accordingly, in this embodiment, revision (addition or deletion) of usable devices assigned for each notebook PC is carried out. Whether a device is allowed for use requires entry of the password described earlier.

Figure 17:
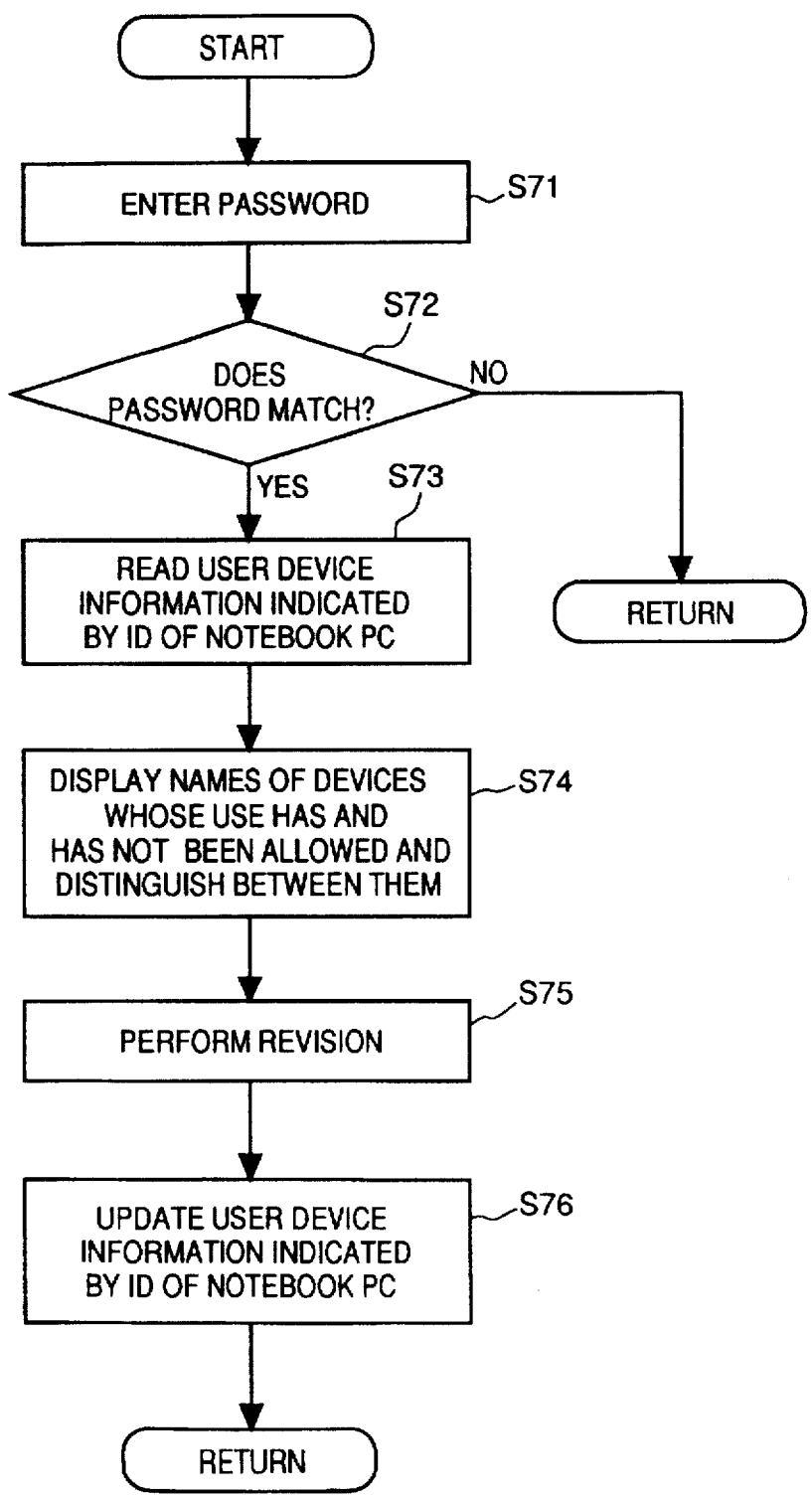
FIG. 17 is a flowchart illustrating the details of a processing step for changing device environment shown in FIG. 6.

Processing for modifying file security will be described with reference to FIG. 17.

First, at step S71 of the flowchart, a character string is entered by a menu display and keyboard 400 for the purpose of inputting a password. Next, at step S72, the entered character string is compared with the password information 901 in NVRAM 217 to determine whether matching is achieved.

Figure 18:
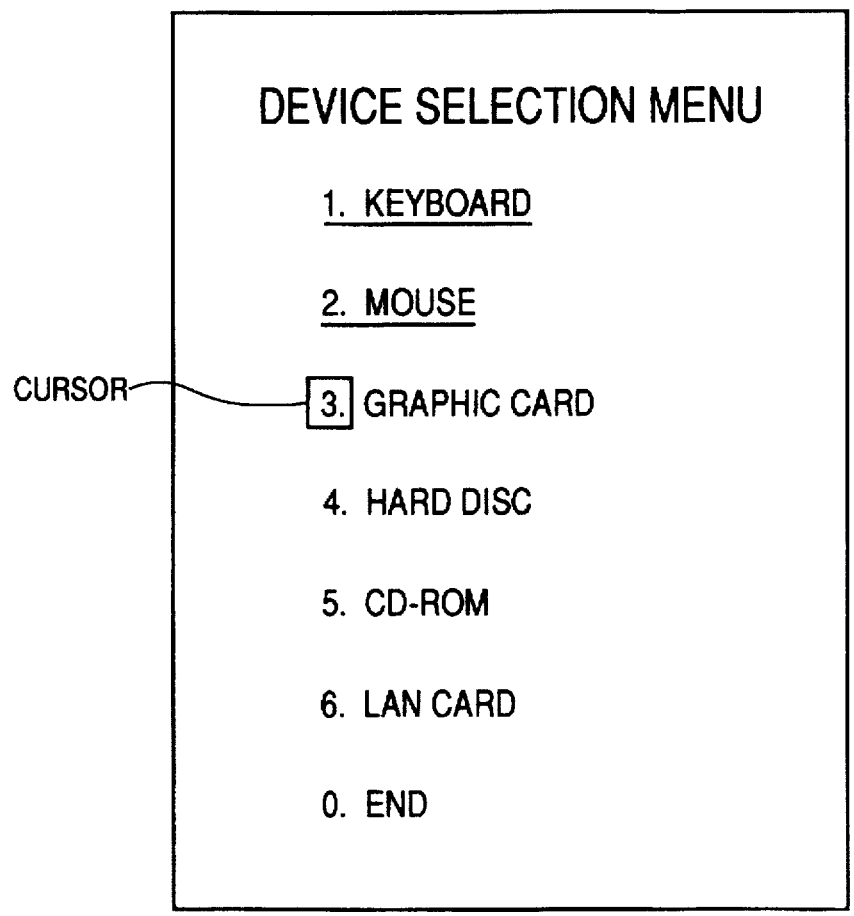
FIG. 18 is a diagram showing an example of a menu screen in processing for changing a device.

In case of matching, the program proceeds to step S73, at which the relevant information is read out of the user registration information field 902 from the ID Of the connected notebook PC, cards presently installed in the dock 200 are scanned in order and a list of the cards is displayed (step S74). This list is displayed so as to make it possible to distinguish between devices whose use is and is not allowed with this notebook PC. This is illustrated in FIG. 18, in which the underlined devices are presently allowed for use.

At this time the cursor is situated at the number of the device located at the top of the devices not allowed for use. If, say, the space bar is pressed under these conditions, the name of the device at which the cursor is present is underlined to enable use of the device. By subsequently operating a cursor key to situate the cursor at the position of the number of a desired device and then pressing the space bar, permission to use the device is designated. The setting operation is terminated by selecting "0" at the bottom of the list menu.

Upon being informed of the end of the operation for setting whether devices are to be allowed for use or not, the CPU 101 advances processing to step S76, at which the CPU 101 updates the content of the user registration information of the ID of the notebook PC in accordance with what has been designated.

<User Deletion Processing and Password Modification Processing (steps S22, S24)>

User deletion processing deletes all registration information of a registered notebook PC from the NVRAM 217.

Password modification processing is that for a case in which a password in the NVRAM 217 of the supervisor is changed. In this case, an entered password is changed only for an instance in which processing for registering a new notebook PC is executed; there is absolutely no effect upon already registered notebook PCs and that these notebook PCs can be used as before should readily be appreciated from the foregoing description.

These two processing operations can readily be understood from the description given thus far and need not be described in detail. In user deletion processing, registration of a notebook PC that has been connected is deleted. If a situation arises in which registration of existing notebook PCs is to be erased, as when a dock is moved to a different post or station, connecting notebook PCs, whose registration is to be erased, to the dock one after another is very troublesome. Accordingly, it should be so arranged that the users of individual notebook PCs are given user IDs. A user ID may be decided by the supervisor or the by user. In any case, a user ID is made an item of verification between the user and the supervisor. Naturally, user IDs and the IDs of their notebook PCs are stored in the NVRAM 217 in correlated form. By adopting this arrangement, user registration information is found in the NVRAM 217 by having the supervisor enter the user ID, and then the supervisor can erase this information.

Further, in order to arrange it so that a change of password cannot be carried out unless the individual attempting to make the change is so qualified, it is required that the individual enter the old password. The individual can set the new password only after the it is determined that the old password matches the stored information.

<File Security Processing>

In order to maintain the confidentiality of files which the users of respective notebook PCs have preserved in the hard disk 214 of the dock 200 in the system according to this embodiment, each user writes the files in a directory set by the user, whereupon the file is encrypted. This is as described previously in "File-Security Modification Processing". As a result of this operation, other users cannot interpret the contents of the files even if the files are read. The directory of interest is stored in the file security information part of the user registration information 902 within the NVRAM 217.

Further, when the operator writes a file under a directory designated by the operator, or when the operator reads in this file, designating encryption or decoding each time becomes a troublesome task. In the present embodiment, this problem also is solved.

In order to facilitate an understanding of this processing, the processing will be described with reference to the block diagram of FIG. 19, which illustrates only the principal components involved in file security. The bold lines indicate the flow of data written and read, and the fine lines show the flow of control signals and the like.

Figure 19:
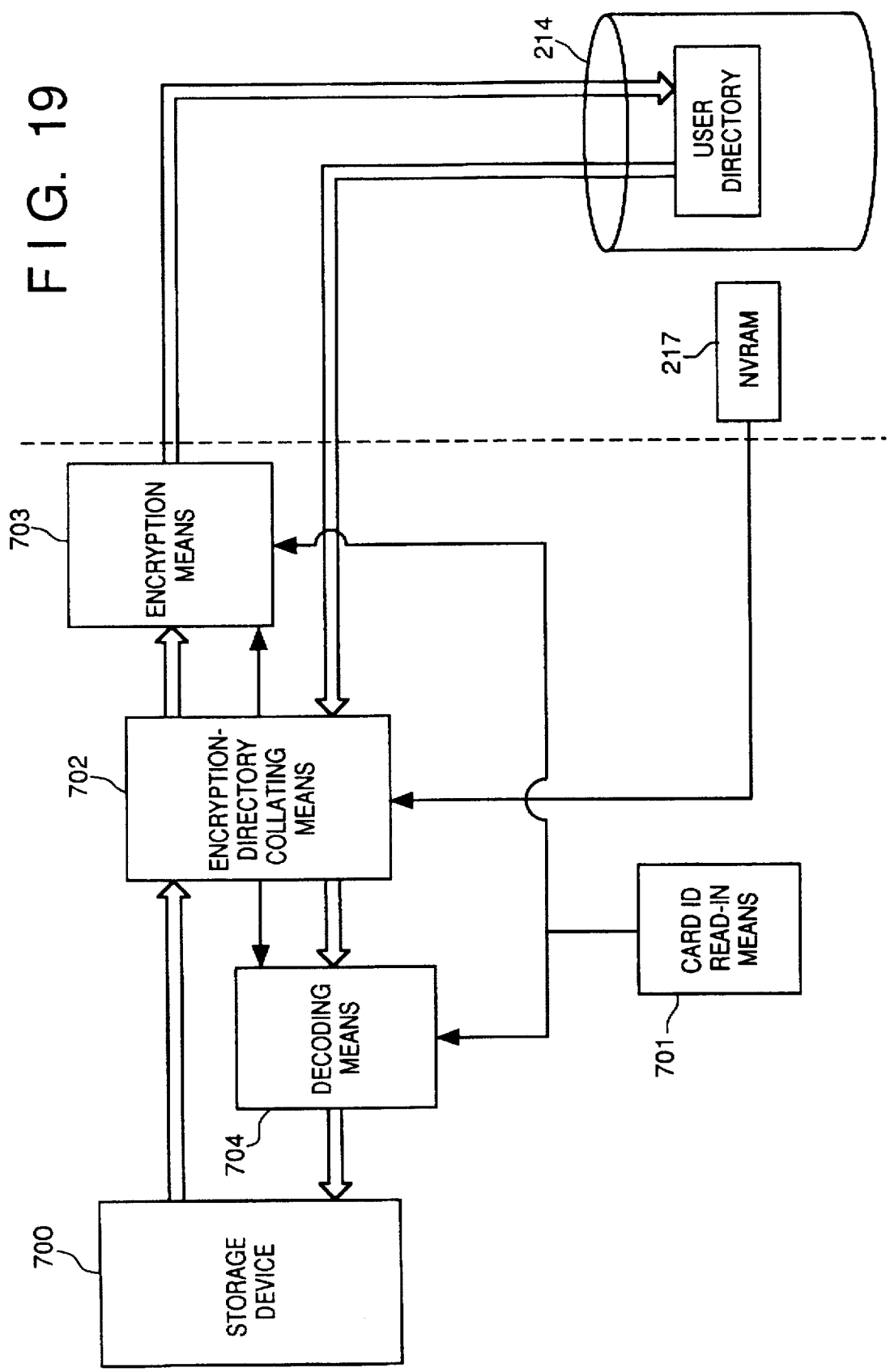
FIG. 19 is a block diagram showing the principal components involved in file security according to the present invention.

As shown in FIG. 19, numeral 700 denotes a storage device such as the main memory 102 or a hard disk in the notebook PC 100. Numeral 702 denotes encryption-directory collating means for judging whether a location at which writing or reading is to take place is a directory that is the object of encryption (hereinafter referred to as an "encryption directory") as designated by the user. For example, if, in a case where a write operation has been designated, the directory designated by the write designation coincides with the name of a directory that has been stored in the file security information field (within the NVRAM 217) specified on the basis of the ID of the connected notebook PC, encryption means 703 is so notified. In case of coincidence with a directory that is the object of a read-in operation, decoding means 704 is so notified.

Upon receiving the aforementioned notification from the encryption-directory collating means 702, the encryption means 703 encrypts the data that is the object of the writing operation (the data from the storage device 700) using the ID of its own notebook PC (stored in the ROM 103) as a parameter. When the data is encrypted, values are assigned and encryption and decoding are carried out based upon these values. Since the processing for accomplishing this is well known, it need not be described here.

Upon receiving the aforementioned notification from the encryption-directory collating means 702, the decoding means 704 decodes the read data using the ID of the notebook PC as a parameter and outputs the decoded results to the storage device 700.

The foregoing example describes the relationship between the hard disk 214 in the dock 200 and the main memory 102 and hard disk 110 in the notebook PC 100. Operation is the same in a case where a file in a relevant directory of the hard disk 214 in dock 200 is copied or moved to another directory (route directory) and in a case where the reverse is carried out.

Figure 20:
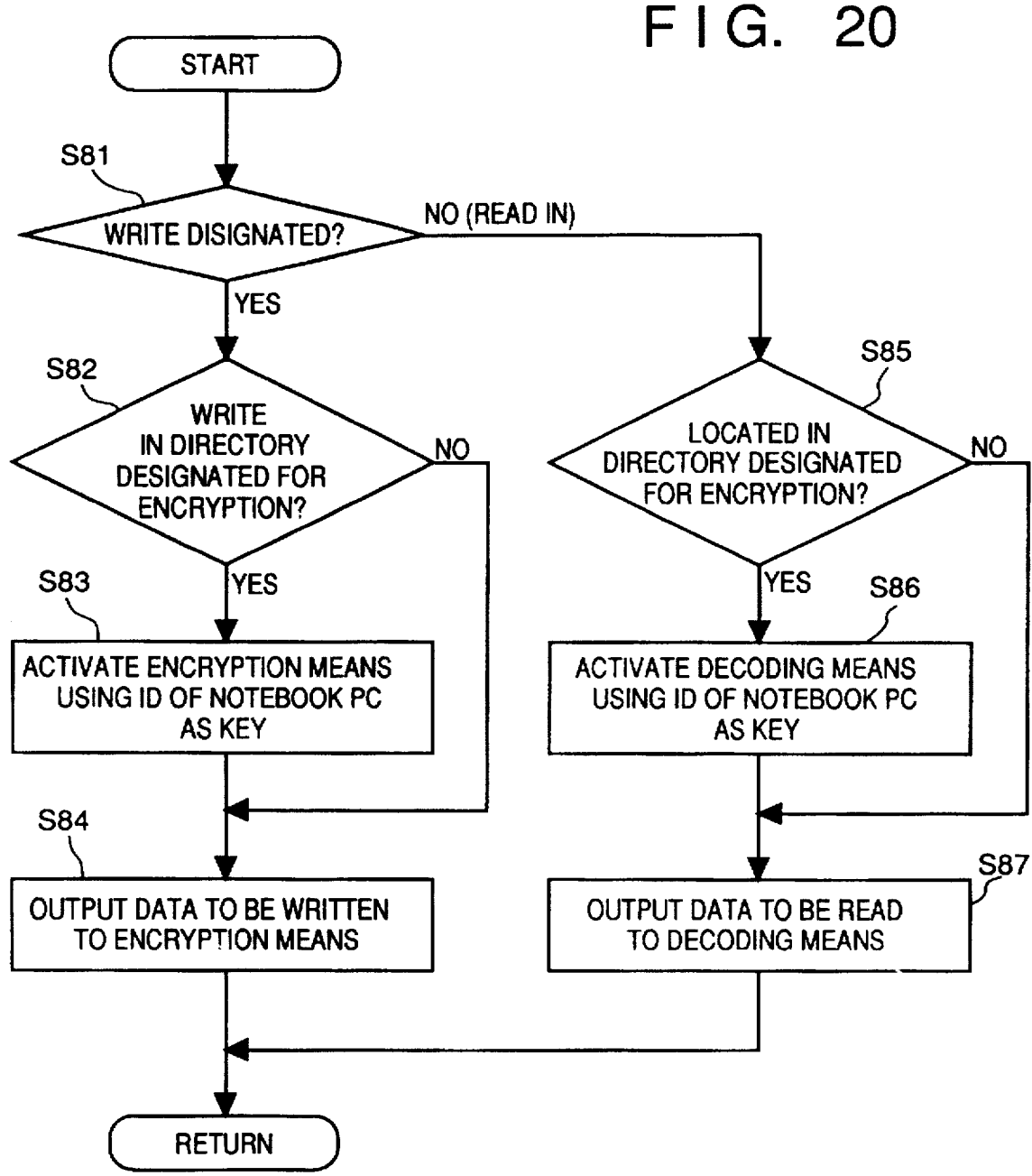
FIG. 20 is a flowchart illustrating a processing procedure involved in writing and reading files in FIG. 19.

The outline of operation given above will now be described as a procedure with reference to the flowchart of FIG. 20.

First, it is determined at step S81 whether a write operation has been designated. If the decision rendered is "YES", then it is determined at step S82 whether destination of the data to be written is an encryption directory. If the decision rendered is "YES", then the encryption means is activated at step S83; otherwise, the processing of step S83 is skipped. In any case, the data to be written is outputted to the encryption means 703 (step S84). As a result, the encryption means 703, if actuated, encrypts the write data using the notebook PC ID as a key. If the encryption means 703 has not been actuated, it merely delivers the write data to the location designated for the output. Thus, if a file is written in under a directory designated by the user, the file is encrypted in a format specific to the ID of the notebook PC.

In a case where the write operation has not been designated, i.e., if it is determined that read-in has been designated, then the program proceeds to step S85, where it is determined whether the read-in file is within the encryption directory. If the answer at step S85 is "YES", then the decoding means 704 is actuated at step S86; otherwise, the processing of step S86 is skipped. When processing proceeds to step S87, the data that has been read is outputted to the decoding means 704. As a result, the decoding means 704, if actuated, decodes the read data using the notebook PC ID as a key and outputs the decoded data to the storage device 700. If the decoding means 704 has not been actuated, it merely delivers the read data to the designated location without subjecting it to any processing.

Thus, when the user of the notebook PC 100 works with an application program after the notebook PC has been connected to the dock 200, writes a file under an encryption directory of the hard disk 214 or executes save processing, the data is automatically subjected to encryption processing in accordance with the ID of the notebook PC connected. Further, in a case where a file in the encryption directory is read in, the file is not read in as normal data so long as the notebook PC connected to the dock is not that of an authorized user; hence, file confidentiality can be maintained. In addition, a convenient feature is that merely moving the file from the directory to another location makes it possible for the encrypted data to be read freely and viewed by another user. In this case the fact that a file can viewed by another user means that the file can be read in using the application that created it and can be edited. Further, since a file server on a network can be treated as a virtual storage device, byway of example, it can be readily surmised that it will be possible to cope with this situation as well.

Another convenient feature is that when a directory is created on the hard disk within the dock, the directory can be set as the above-mentioned encryption directory.

In this case, when a directory is created, information indicating this fact is added on. A program for monitoring additions to or deletions for directories registered on the OS is started up in advance in a case where an indication has been received to the effect that a directory will be deleted.

Figure 21:
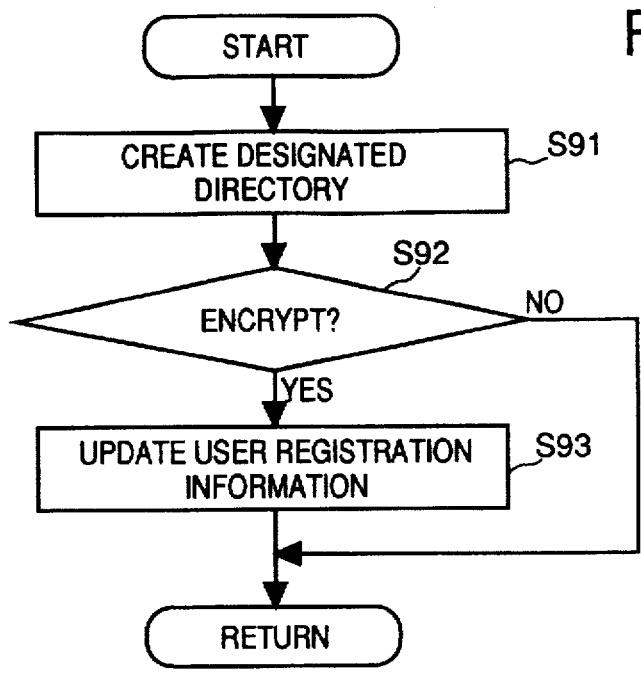
FIG. 21 is a flowchart showing a processing procedure for creating directories which need encryption in this embodiment.

FIG. 21 illustrates a processing procedure executed when an operation for creating a directory is performed.

A designated directory at a designated location is created at step S91 by using the functions of the usual OS. It is then determined at step S92 whether encryption has been designated. When encryption has been designated, the program proceeds to step S93, at which the name of the created directory is added to the user registration information field 902 (the file security information field) specified by the OS running at the present time and the ID of the notebook PC connected.

Figure 22:
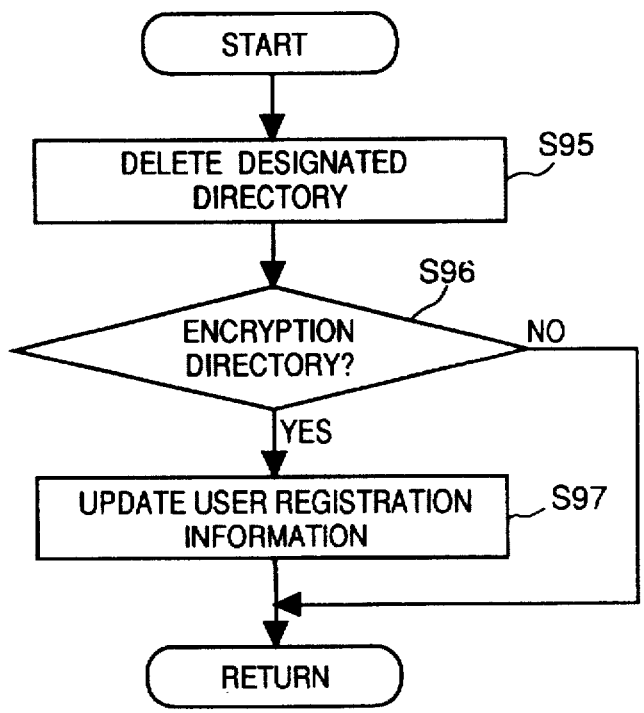
FIG. 22 is a flowchart showing a processing procedure for creating directories in this embodiment.

Conversely, in a case where a directory is deleted, processing is executed in accordance with the flowchart of FIG. 22.

First, a designated directory is deleted at step S95 and it is determined at step S96 whether the deleted directory was an encryption directory designated by the ID of this notebook PC. In case of a "YES" decision at step S96, the name of the directory is deleted from the file security information field contained in the user registration information (step S97).

If operation is performed as set forth above, the result is the same as the processing of FIG. 14. The user then freely creates his or her own directory and stores files under the directory created, thereby making it possible to maintain the security of the files.

It is preferred that an arrangement be adopted in which an encryption directory that has been created cannot be deleted by another user (namely the notebook PC of another user). To accomplish this, steps of searching the contents of the NVRAM 217 by the name of the directory to be deleted and of determining whether this is the encryption directory of another user are provided immediately ahead of step S95 and processing is advanced to step S95 only if the directory is one's own encryption directory (or only if a user other than oneself has not designated the directory as an encryption directory). In all other cases a message is displayed to the effect that the designation is invalid.

In accordance with the description given above, when the operator moves or copies a file located within his or her own encryption directory to a directory for which encryption has not been designated by this operator, the encryption file is converted to a data file that is capable of being decoded. If it so happens that the directory that is the destination of the moved or copied file has been designated as an encryption directory by the user of another notebook PC, then even though it is not required to perform decoding when this user reads in this file, erroneous decoding processing is executed in accordance with the ID of the user's own notebook PC.

In a case where a file is copied without notice from another party's encryption directory to one's own encryption directory, a message file created in one's own encryption directory may be transferred to the other party's encryption directory (particularly another user's encryption directory located within another dock connected to a network). Though this is convenient from the viewpoint of maintaining security, a problem that arises is the other party will be unable to decode the message.

The following methods are available as possible solutions to this problem:

(1) In a case where the directory that is the destination of the transfer is the encryption directory of another user, the transform is forbidden and a message to this effect is displayed for the operator to read. Though this makes it possible to preclude the aforesaid problem, this technique is not especially suited to an information exchange via a network. Although no problem is encountered in a case where a shared non-encryption directory is created and a file is copied to this directory, an unspecified number of individuals can read in the file and view its contents. Hence, intrusion by a third party cannot be prevented.

(2) It may be so arranged that the encryption directory can be recognized only by the user who designated it. In this case, another party's directory is treated as not existing from the start and therefore the user need not be aware even of the fact that encryption has been carried out. However, a problem the same that mentioned is (1) above remains.

(3) In a case in which a file within an encryption directory is written in, encryption processing is executed as a rule but information (a single bit is sufficient) indicating whether each individual file has itself been encrypted or not is added on. If a file under one's own encryption directory is transferred under the encryption directory of another party, first decoding processing is executed and the decoded file is transferred as an unencrypted file. In this case the encryption-directory collating means 702 examines the aforementioned bit and, if it is judged that the data is unencrypted data, decoding processing is not executed even if the data is located under an encryption directory. In the case of the converse operation, namely in which data within an encryption directory of another party is transferred to one's own encryption directory, this processing is not executed.

In this case, it is also possible to deal positively with an instance in which a message is sent to the other party, and therefore the problem encountered in (1) and (2) above can be solved. However, the file can still be read in by a third party. In other words, a problem that still remains is that when two parties are communicating, a third party is capable of reading the exchange of data.

4. First, it is decided that a single encryption directory is capable of being used by only a single notebook PC (i.e., the users of a plurality of notebook PCs are forbidden from designating the same directory as an encryption directory). In a case where a file under an encryption directory designated by a first party is transferred to another directory, the file is decoded based upon the ID of the first party's own notebook PC. (Up to this point, processing is the same as in the above-described embodiment.) Encryption is performed again in accordance with the ID of the notebook PC of the encryption directory that is the destination of the transfer. (Even if this notebook PC has not been connected, the ID can be determined conversely from the name of the directory.) At the time of the converse operation, the above-described processing is not executed in order to maintain security.

If this arrangement is adopted, all of the problems mentioned in (1)-(3) above are eliminated.

<Screen Control>

In general, the number of dots capable of being displayed by the LCD display of a notebook PC is on the order of 640×400 dots, and the space in which a display can be presented is less in comparison with the display resolution of the CRT display unit 300 (though this depends also upon the function of the graphic controller card 213) described in the foregoing embodiment.

In a case where the notebook PC 100 is connected to the dock 200 and the notebook PC is allowed to use the graphic controller card 213, several windows can be displayed at least in a larger space and an ideal operating environment can be obtained.

For example, if Microsoft's operating system "MS-WINDOWS" is taken as an example, applications that run on this OS secure windows and run in these windows. The size of a window depends upon the particular application but size and display position can be changed at will. With an application of this kind, window size and position information (hereinafter referred to as "window information") are saved on a hard disk or the like when operation of the application is terminated or when display position or size is changed. This is done so that the size and display position of an initial window that prevailed when the application was executed will be unchanged the next time the application is run.

Though such a function may be welcomed by users, it leads to problems in a combination of a notebook PC and dock.

Specifically, there are cases in which the notebook PC 100 is connected to the dock 200, the CRT display unit 300 is used in the high-resolution mode, processing proceeds with the window of an application being displayed along one edge of the display screen (the right edge or lower edge if the upper left-hand corner of the window is taken as the origin) and then processing is terminated. If the notebook PC is subsequently detached from the dock and the same application is started up using the LCD display of the notebook PC, the window will come to be displayed in virtual space off the screen of the LCD. If this happens, the user will not be able to use the application or, even if the application can be used, it will be necessary for the user to move and resize the window and make it fit inside the screen.

With regard to a window application, therefore, it is necessary to separate window environments into a case in which operations are performed by a notebook PC alone and a case in which operations are carried out using the notebook PC and a dock in combination.

Accordingly, in this embodiment, if an application that has been stored in the hard disk of the notebook PC is started up with the notebook PC having been connected to the dock, the window information possessed by the application is placed on a stack temporarily (as by changing it to another file name) and separately prepared window information suited to the dock is stored in a form capable of being recognized by the application. If, under these conditions, the user changes the size and position of the window while observing the screen, only the window information suited to the dock is rewritten and there is no change in the window information dealt with by the notebook PC alone.

At the moment the application is terminated, or at the moment a procedure for cutting off the notebook PC from the dock is carried out, now the altered window information suited to the dock is placed on a stack and window information for the notebook PC alone, which information was put on standby previously, is restored.

In a case where the window information suited to the dock starts up an application from the notebook PC for the first time following connection of the notebook PC to the dock, the window information of the notebook PC alone is created in duplicate. One duplicate is placed on a stack upon being made window information suited to the dock and the other duplicate is placed on a stack upon being made window information suited to the notebook PC alone.

The window information suited to the dock may be stored on the side of the notebook PC (hard disk 110) or on the side of the dock (hard disk 214 or NVRAM 217).

Figure 25:
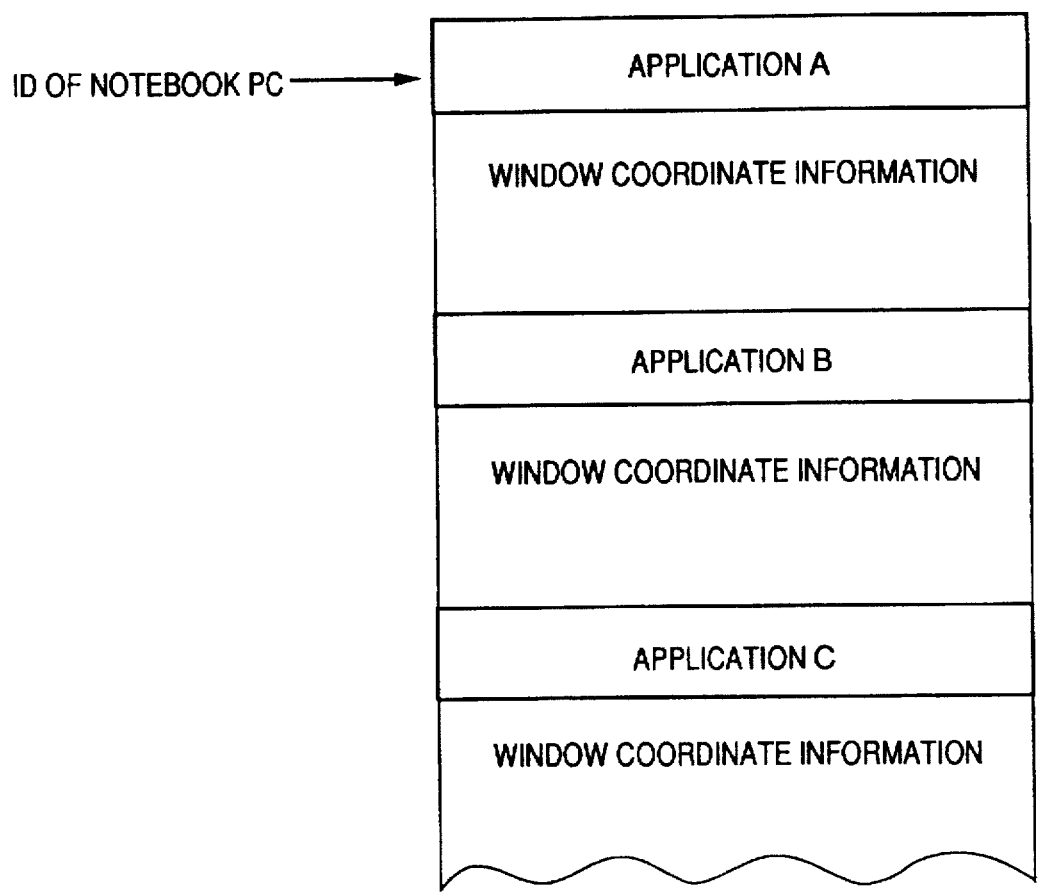
FIG. 25 is a diagram showing the details of window environment information in a case where the dock has been provided with window information.
Figure 26:
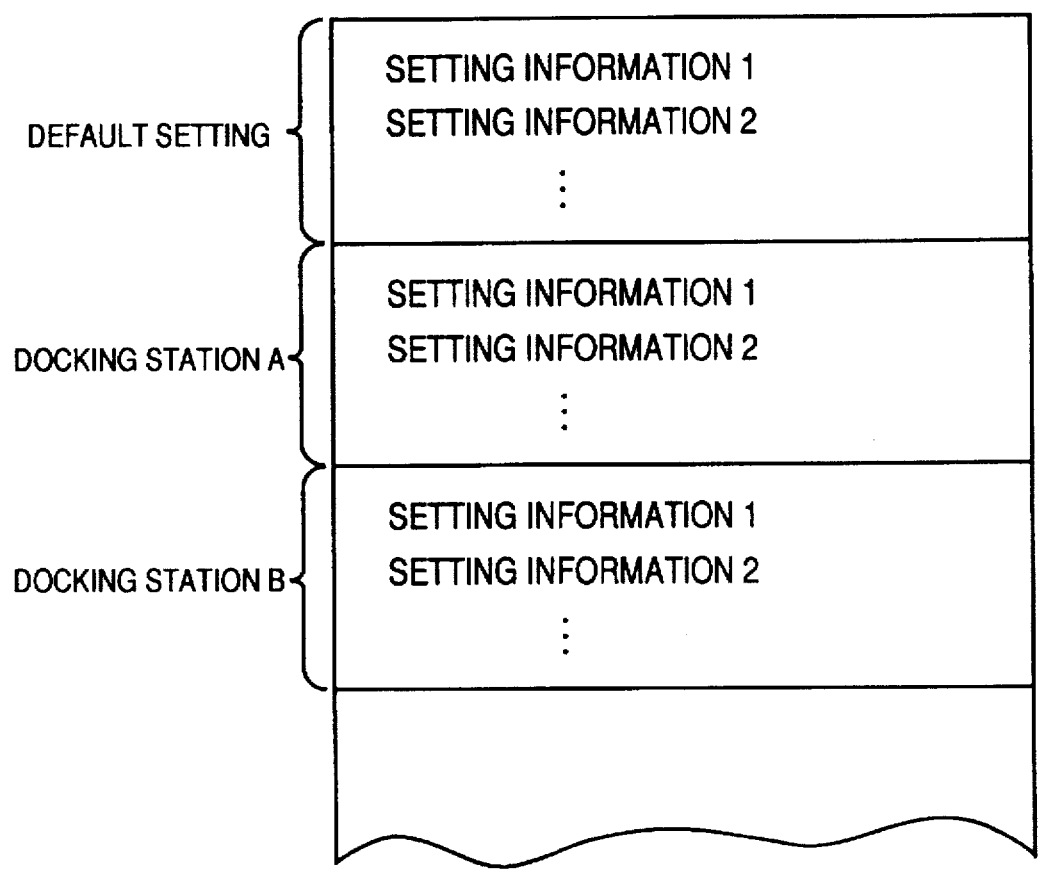
FIG. 26 is a diagram showing the details of window environment information in a case where the notebook PC has been provided with window information.

In a case where this information is stored on the side of the dock, it is necessary that the window information be saved in a form correlated with the ID of the notebook PC that is using this window information, as shown in FIG. 25. If the information is saved on the side of the notebook PC, then the window information (referred to as "set information" in FIG. 26) of each application is provided with the above-mentioned information in a form correlated with the IDs of the docks, as shown in FIG. 26.

Figure 23:
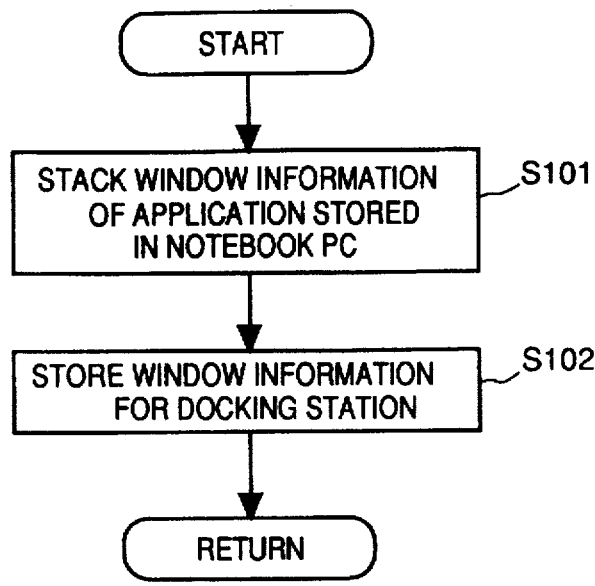
FIG. 23 is a flowchart illustrating processing before an application is executed following interconnection of the notebook PC and dock.
Figure 24:
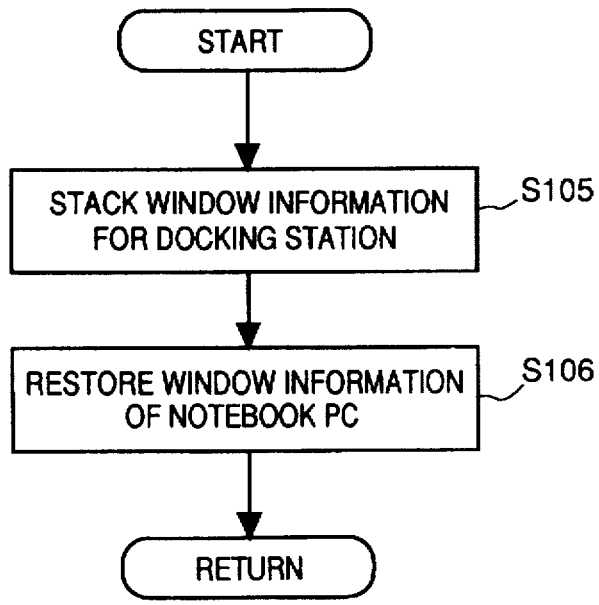
FIG. 24 is a flowchart illustrating processing after an application is executed following interconnection of the notebook PC and dock.

FIGS. 23 and 24 illustrate the processing executed by the CPU 101.

The processing based upon the flowchart of FIG. 23 should be executed in a case where the notebook PC has been connected to the dock or immediately before an application is started up.

At step S101 of the flowchart of FIG. 23, processing is executed to stack the window information of the application stored in the notebook PC, after which the window information corresponding to the dock is stored at a location managed by the application (step 102).

The processing of FIG. 24 should be executed when the operation of an application is terminated or in a case where a procedure for detaching the notebook PC from the dock is carried out.

Specifically, window information suited to the dock is stacked at step S105, and the already stacked window information for the notebook PC alone is restored at step S106.

<Other Embodiments>

In the first embodiment set forth above, it has been described that usable resources are stored for each notebook PC ID and that a notebook PC is capable of selecting dock functions within these limits.

However, if a notebook PC has been connected to the dock, there are also cases in which it is better to arrange it so that all resources usable by a designated OS can be exploited automatically. For example, there are occasions where the dock is used by truly limited notebook PCs, in which case all of these notebook PCs are operated in the latest environment.

When such an arrangement is adopted, a notebook PC can be utilized in the latest environment automatically without the user being required to perform any operation even when extension cards are connected to the dock anew. The determination as to whether a connected notebook PC has been granted permission to use the dock is the same as in the first embodiment.

Figure 27:
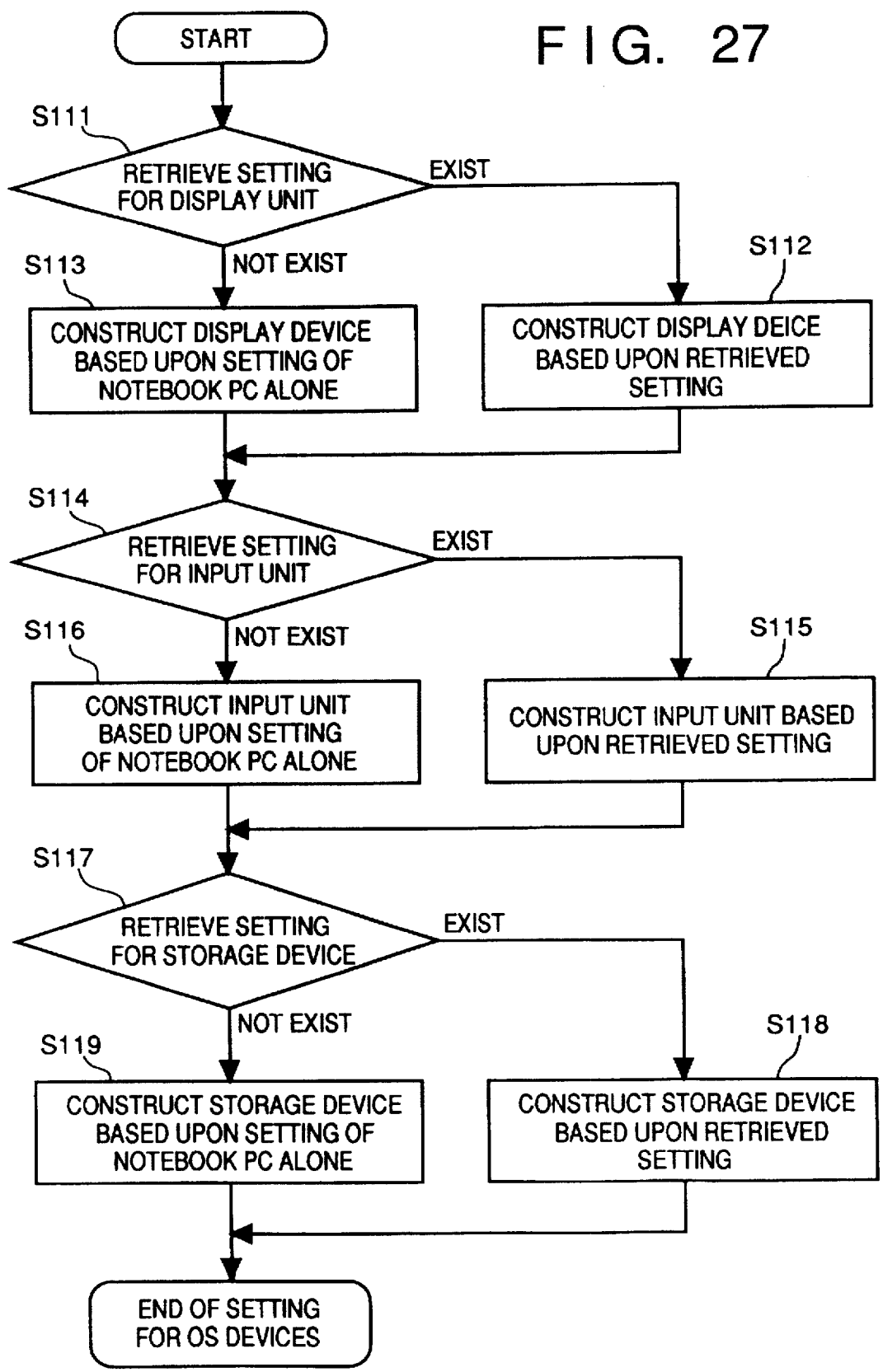
FIG. 27 is a flowchart showing processing for automatically constructing an environment in another embodiment of the present invention.

A procedure shown in FIG. 27 would be executed as the necessary processing. It should be noted that this processing would be executed in a case where an instruction for optimizing the environment is given when the user sets the OS.

At step S111 of the flowchart, a setting related to the display unit is retrieved from among the resources connected to the dock. In a case where connection of a graphic card is sensed, the program proceeds to step S112, at which the user registration information is updated to give an environment that uses the graphic card. (This updating will be referred to simply as "setting" below.) If an extended display function cannot be retrieved, the program proceeds to step S113, at which a setting is made in such a manner that a display is performed based upon the setting of the notebook PC.

Next, the program proceeds to step S114, at which an input/output unit is retrieved. In this embodiment, a LAN card or the like would be an example of an input/output unit. In a case where the input/output unit can be retrieved, the program proceeds to step S115, at which a setting is made so as to construct the retrieved input/output unit. If the input/output unit cannot be retrieved, the program proceeds to step S116, at which a setting is made so as to construct an input/output unit based upon the setting of the notebook PC alone. It should be noted that a setting is made so as to use a keyboard connected to the dock because the keyboard is an essential input unit.

Next, the program proceeds to step S117, at which a storage device is retrieved. In a case where the memory device can be retrieved, a setting is made at step S118 in such a manner that the retrieved device also can be used. If the memory device cannot be retrieved, a setting is made so as to construct the memory device of the notebook PC.

In other words, retrieval is performed for each type of resource and the user registration information indicated by the ID of the particular notebook PC is updated based upon the retrieved results.

It should be noted that although the object searched is the device table 903, an arrangement may be adopted in which a search is conducted, in regular order, as to whether extension cards have been connected to the various interfaces (connectors).

Further, in the foregoing embodiment, an OS is selected in a case where a notebook PC is connected to a dock upon being placed in the suspended state. However, it may be considered that the reason for placing the notebook PC in the suspended state in the first place is to allow operation to resume in the ideal environment after the notebook PC is connected to the dock.

In such case, an arrangement may be adopted in which operation of the notebook PC resumes in the OS of the notebook PC unconditionally when the notebook PC has been connected to the dock. It may be so arranged that the selection of the OS can be carried out only after the power supply of the notebook PC is turned off, the notebook PC is connected to the dock and a power supply switch provided on the dock is then turned on. In a case where the notebook PC has been connected in the suspended state, it will suffice to restore the stacked state. If the power supply is turned on again from the start, it will suffice to provide the program, which is involved in OS selection, in the booting program within the main memory 102. The booting program in this case naturally would include processing for judging whether the notebook PC has been connected to the dock as well as processing for determining, based upon the ID of the notebook PC, whether use of the dock has been allowed in a case where the connection has been sensed.

According to the foregoing embodiment, the ID of a notebook PC allowed for use is stored in NVRAM on the side of the dock and, on the basis of whether or not an ID has been registered, a decision is rendered by the dock at the time of connection as to whether use of the dock has been allowed. However, an arrangement may be adopted in which the notebook PC is made to perform this operation. In such case the notebook PC would store the IDs of the docks whose use has been allowed and would also store the user registration information (the functions of individual docks are not necessarily identical) of the respective docks. In other words, if stated solely with regard to the determination as to whether use has been allowed or not, in this embodiment the determination is made based upon whether the ID of a notebook PC has been stored in the NVRAM of the dock. However, it may be so arranged that the determination is made based upon whether the ID of the dock has been stored in the NVRAM of the notebook PC. With regard to the aforementioned security file, however, encryption and decoding are carried out using the ID of the notebook PC as the key.

Further, the notebook PCs described in the foregoing embodiment are capable of performing various operations by themselves and not all of them must make use of a dock. This means that it is meaningless and costly to provide an NVRAM, which usually is not used, on the side of the notebook PC. It is better, therefore, to provide the dock with the NVRAM. In addition, though it is permissible to use the hard disk of the dock instead of the NVRAM, such a device often is detachable and therefore the NVRAM is more convenient.

Thus, in accordance with the embodiments as described above, when a notebook PC is connected to a docking station, whether the notebook PC is allowed for use with the docking station is determined based upon the ID of the notebook PC or the ID of the docking station. This makes it possible to maintain the security of the docking station and of the various resources connected thereto.

Further, in a case where the notebook PC is connected to the docking station, resources whose use has been allowed are used to automatically decide the environment of the OS, which is then run. As a result, the user is relieved of troublesome operations. In particular, in a case where it is so arranged that a device setting as to whether a device can or cannot be used is not performed for each individual user, it can be arranged so that the optimum device is selected from the resources of both the notebook PC and docking station. This frees the user from an operation such as the setting of usable devices each time.

Further, since the environment of the docking station is provided independently user by user (i.e., for each notebook PC), for example, if the user of a notebook PC is given permission to use a plurality of docking stations, it is possible for the user to operate each docking station in the manner suited to the particular environment even if the resources of the docking stations differ from each other.

Furthermore, in the storage device of the docking station, especially a rewritable hard disk or the like, data is encrypted in an environment decided by the combination of the dock and the notebook PC connected to it. This makes it possible to maintain file security. Moreover, in accordance with the foregoing embodiments, the object of encryption is not the route directory of the hard disk in the docking station but a subdirectory. As a result, the files of various users are not mixed and management is facilitated.

Further, use can be limited user by user at the discretion of the supervisor. For example, access to a network can be denied to a novice operator, thereby making it possible to preclude accidents such as the inadvertent deletion of an important file. When the operator has become sufficiently skilled, the scope of permission given to the operator can be broadened.

In addition, problems stemming from the difference between the display area of the display screen on an individual notebook PC and the display area on the display unit with which the docking station is provided is solved. Specifically, in a case where the notebook PC has been connected to the docking station, operation is resumed in accordance with separately prepared window information. This makes it possible to avoid difficulties which might otherwise occur when the notebook PC is used independently.

Thus, in accordance with the present invention as described above, it is possible to maintain the security of a second electronic device to which a plurality of first electronic devices are capable of being connected.

Further, in accordance with another aspect of the invention, the confidentiality of data stored in a storage unit provided in the second electronic device can be achieved reliably and without the awareness of the operator.

Further, in accordance with the invention, in a system having a first electronic device and a second electronic device in which the display space of the first electronic device is less than that of the second electronic device, after a window application is executed upon connecting the first electronic device to the second electronic device, the application can be executed normally from the display space of the first electronic device without altering window information even if the application is subsequently executed in the first electronic device alone.

As many apparently widely different embodiments of the present invention can be made without departing from the spirit and scope thereof, it is to be understood that the invention is not limited to the specific embodiments thereof except as defined in the appended claims.

What is claimed is:

1. An information processing system including a first electronic apparatus having plural devices including at least a keyboard and a display, said first electronic apparatus being connectable to a second electronic apparatus which is capable of executing processing independently and has a keyboard and a display, the keyboard and the display of said first electronic apparatus being used instead of the keyboard and the display of the second electronic apparatus if the second electronic apparatus is connected to the first electronic apparatus, said system comprising:

determination means for determining whether or not an input password is correct;

designation means for, if said determination means determines that the password is correct, designating a device allowed to be used by the second electronic apparatus if the second electronic apparatus is connected to the first electronic apparatus; and registration means for registering information on the device allowed to be used by the second electronic apparatus.

2. The information processing system according to claim 1, wherein said setting means sets the device allowed to be used by the second electronic apparatus, in a state where the display of the first electronic apparatus distinguishably displays the device allowed to be used by the second electronic apparatus and a device not allowed to be used by the second electronic apparatus.

3. The information processing system according to claim 1, wherein the first electronic apparatus is a docking station which has the shape of a desk top personal computer, and the second electronic apparatus is a notebook-sized personal computer.

4. The information processing system according to claim 3, wherein said first electronic apparatus has an insertion portion where said second electronic apparatus being closed is inserted thereto.

5. An information processing system including a first electronic apparatus having plural devices including at least a keyboard, a display and a storage device, said first electronic apparatus being connectable to a second electronic apparatus which is capable of executing processing independently and has a keyboard and a display, the keyboard and the display of said first electronic apparatus being used instead of the keyboard and the display of the second electronic apparatus if the second electronic apparatus is connected to the first electronic apparatus, said system comprising:

first determination means for, when writing to the storage device of the first electronic apparatus is instructed, determining whether or not a writing destination is a directory designated for encryption;

writing means for, if said first determination means determines that the writing destination is the directory designated for encryption, performing encryption with an ID of the second electronic apparatus connected to the first electronic apparatus, as a key, and performing writing, while if said determination means determines that the writing destination is not a directory designated for encryption, performing writing without encryption;

second determination means for, when reading from the storage device of the first electronic apparatus is instructed, determining whether or not a reading subject is the directory designated for encryption; and reading means for, if said second determination means determines that the reading subject is the directory designated for encryption, performing decryption with the ID of the second electronic apparatus connected to the first electronic apparatus, as a key, and performing reading, while if said second determination means determines that the reading subject is not the directory designated for encryption, performing reading without decryption.

6. The information processing system according to claim 5, wherein the first electronic apparatus is a docking station which has the shape of a desk top personal computer, and the second electronic apparatus is a notebook-sized personal computer.

7. The information processing system according to claim 6, wherein said first electronic apparatus has an insertion portion where said second electronic apparatus being closed is inserted thereto.

8. An information processing system including a first electronic apparatus having plural devices including at least a keyboard and a display, said first electronic apparatus being connectable a second electronic apparatus which is capable of executing processing independently and has a keyboard and a display, the keyboard and the display of said first electronic apparatus being used instead of the keyboard and the display of the second electronic apparatus if the second electronic apparatus is connected to the first electronic apparatus, said system comprising:

memory means for storing first and second window information indicating size and position of a window where an application program to be executed is displayed, first window information being used in a case where the second electronic apparatus is connected to the first electronic apparatus, second window information being used in a case where the second electronic apparatus is used independently; and control means for, when the second electronic apparatus is connected to the first electronic apparatus, executing an application program by using first window information, and for executing, when the second electronic apparatus is used independently, the application program by using second window information.

9. The information processing system according to claim 8, wherein the window information is updated each time the size and position of the window are changed.

10. The information processing system according to claim 8, wherein the window information is stored by application program.

11. The information processing system according to claim 8, wherein the display of the first electronic apparatus is an CRT and the display device of the second electronic apparatus is an LCD.

12. The information processing system according to claim 8, wherein the first electronic apparatus is a docking station which has the shape of a desk top personal computer, and the second electronic apparatus is a notebook-sized personal computer.

13. The information processing system according to claim 12, wherein said first electronic apparatus has an insertion portion where said second electronic apparatus being closed is inserted thereto.

* * * * *

UNITED STATES PATENT AND TRADEMARK OFFICE
CERTIFICATE OF CORRECTION

PATENT NO. : 5,721,835

DATED : February 24, 1998

INVENTOR(S): NOBUYUKI NIWA ET AL.

It is certified that error appears in the above-identified patent and that said Letters Patent is hereby corrected as shown below:

On drawing

SHEET 7

Figure 8, "PASWORD" should read --PASSWORD--; and "PASSWRD" should read --PASSWORD--.

SHEET 13

Figure 16, "SEQURITY" (third occurrence) should read --SECURITY--.

SHEET 22

Figure 27, "DEICE" should read --DEVICE--.

COLUMN 3

Line 37, "it to" should read --is to--.

COLUMN 5

Line 5, "means. As" should read --means. ¶ As--.
    Line 33, "a the" should read --at the--.

COLUMN 7

Line 42, "to be informed the" should read --to be sent to the--.
    Line 61, "achieve to" should read --achieve--.

UNITED STATES PATENT AND TRADEMARK OFFICE
CERTIFICATE OF CORRECTION

PATENT NO. : 5,721,835

DATED : February 24, 1998

INVENTOR(S): NOBUYUKI NIWA ET AL.

It is certified that error appears in the above-identified patent and that said Letters Patent is hereby corrected as shown below:

COLUMN 8

Line 31, "on an" should read --on and--.

COLUMN 12

Line 49, "user" should read --user is--.
    Line 53, "example" should read --of example--.

COLUMN 14

Line 28, "byway" should read --by way--.
    Line 46, "this" should be deleted.
    Line 49, "it judged" should read --it is judged--.

COLUMN 15

Line 52, "system" should read --systems--.

COLUMN 16

Line 66, "Of" should read --of--.

COLUMN 17

Line 44, "or the by" should read --or by the--.
    Line 56, "the it is" should read --it is--.

UNITED STATES PATENT AND TRADEMARK OFFICE
CERTIFICATE OF CORRECTION

PATENT NO. : 5,721,835

DATED : February 24, 1998

INVENTOR(S) : NOBUYUKI NIWA ET AL.

It is certified that error appears in the above-identified patent and that said Letters Patent is hereby corrected as shown below:

COLUMN 19

Line 28, "can" should read --can be---.
    Line 32, "byway" should read --by way---.

COLUMN 20

Line 54, "that" should read --as that--; and
      "is" should read --as--.

COLUMN 25

Line 7, "notebook." should read --notebook--.

COLUMN 27

Line 13, "connectable" should read --connectable to---.

Signed and Sealed this

Sixth Day of October, 1998

Attest:

BRUCE LEHMAN

Attesting Officer     Commissioner of Patents and Trademarks